(12) United States Patent
Mian et al.

(10) Patent No.: US 8,140,250 B2
(45) Date of Patent: Mar. 20, 2012

(54) RAIL VEHICLE IDENTIFICATION AND PROCESSING

(75) Inventors: Zahid F. Mian, Loudonville, NY (US); Jeremy C. Mullaney, Troy, NY (US)

(73) Assignee: International Electronics Machines Corporation, Troy, NY (US)

( * ) Notice: Subject to any disclaimer, the term of this patent is extended or adjusted under 35 U.S.C. 154(b) by 795 days.

(21) Appl. No.: 12/171,438

(22) Filed: Jul. 11, 2008

(65) Prior Publication Data
US 2009/0055043 A1   Feb. 26, 2009

Related U.S. Application Data

(60) Provisional application No. 60/935,575, filed on Aug. 20, 2007.

(51) Int. Cl.
*G06G 7/76* (2006.01)

(52) U.S. Cl. ............. 701/117; 701/19; 701/29; 701/33; 104/26.1

(58) Field of Classification Search ............ 701/19, 701/29, 33, 117; 104/26.1; 105/4.2, 26.05; 246/122 R, 169 R
See application file for complete search history.

(56) References Cited

U.S. PATENT DOCUMENTS

| | | | |
|---|---|---|---|
| 1,028,831 A | 6/1912 | Stagg | |
| 1,824,108 A | 9/1931 | Abendroth | |
| 3,132,749 A | 5/1964 | Whitehouse et al. | |
| 3,211,907 A * | 10/1965 | Blaisdell et al. | 246/3 |
| 3,247,509 A * | 4/1966 | Hamann et al. | 342/44 |
| 3,558,876 A | 1/1971 | Tillman et al. | |
| 3,682,325 A | 8/1972 | Peterson et al. | |
| 3,721,821 A * | 3/1973 | Blanyer | 246/249 |
| 3,736,420 A * | 5/1973 | Elder et al. | 246/182 A |
| 3,750,897 A | 8/1973 | Murato et al. | |
| 3,854,598 A | 12/1974 | Yamazaki et al. | |
| 4,288,689 A * | 9/1981 | Lemelson et al. | 235/435 |
| 4,532,511 A * | 7/1985 | Lemelson | 340/933 |
| 4,610,206 A * | 9/1986 | Kubala et al. | 104/26.1 |
| 4,904,939 A | 2/1990 | Mian | |
| 5,139,161 A | 8/1992 | Long | |
| 5,181,472 A * | 1/1993 | Scheuchzer | 104/2 |
| 5,433,111 A * | 7/1995 | Hershey et al. | 73/593 |
| 5,531,337 A | 7/1996 | Cappelletti et al. | |
| 5,636,026 A | 6/1997 | Mian et al. | |
| 5,678,789 A | 10/1997 | Pipich | |

(Continued)

OTHER PUBLICATIONS

Unknown, "Sick IVP—A New Dimension in Vision," accessed from http://www.sickivp.se/sickivp/en.html, date unknown, printed on Jan. 30, 2008, 1 page.

(Continued)

*Primary Examiner* — Darnell Jayne
*Assistant Examiner* — Sasha T Varghese
(74) *Attorney, Agent, or Firm* — John W. LaBatt; Hoffman Warnick LLC

(57) ABSTRACT

A solution for further automating the identification, processing, and/or routing of rail vehicles is provided. Each individual rail vehicle in a series of rail vehicles is identified and measurement data is acquired for the rail vehicle. The measurement data is analyzed and the rail vehicle is automatically routed based on the analysis. The rail vehicle can be routed to an outbound track based on a destination, to a maintenance shop for repair, and/or to a local track for repair and/or re-measurement. The solution can further incorporate expert systems and data mining to reduce the number of rail vehicles that are unnecessarily routed for repair and/or inadvertently allowed to pass with one or more unsafe conditions.

20 Claims, 17 Drawing Sheets

U.S. PATENT DOCUMENTS

| | | | |
|---|---|---|---|
| 5,828,979 A * | 10/1998 | Polivka et al. | 701/117 |
| 6,125,311 A * | 9/2000 | Lo | 701/29 |
| 6,397,130 B1 * | 5/2002 | Carr et al. | 701/19 |
| 6,416,020 B1 * | 7/2002 | Gronskov | 246/169 D |
| 6,484,074 B1 * | 11/2002 | Hazard et al. | 701/19 |
| 6,523,411 B1 | 2/2003 | Mian et al. | |
| 6,636,814 B1 * | 10/2003 | McCullers et al. | 702/34 |
| 6,655,502 B2 * | 12/2003 | Sokoll et al. | 188/1.11 W |
| 6,681,160 B2 * | 1/2004 | Bidaud | 701/19 |
| 6,768,551 B2 | 7/2004 | Mian et al. | |
| 7,593,795 B2 * | 9/2009 | Kane et al. | 701/19 |
| 2002/0007289 A1 * | 1/2002 | Malin et al. | 705/4 |
| 2002/0101361 A1 * | 8/2002 | Barich et al. | 340/907 |
| 2003/0072001 A1 | 4/2003 | Mian et al. | |
| 2004/0049327 A1 * | 3/2004 | Kondratenko et al. | 701/19 |
| 2004/0068361 A1 * | 4/2004 | Cross et al. | 701/117 |
| 2004/0181321 A1 * | 9/2004 | Fries et al. | 701/19 |
| 2005/0226201 A1 * | 10/2005 | McMillin | 370/348 |
| 2005/0258943 A1 | 11/2005 | Mian et al. | |
| 2005/0259273 A1 | 11/2005 | Mian et al. | |
| 2007/0064244 A1 | 3/2007 | Mian et al. | |
| 2007/0075192 A1 | 4/2007 | Mian et al. | |
| 2007/0233333 A1 * | 10/2007 | Moffett et al. | 701/19 |
| 2008/0149782 A1 * | 6/2008 | Tiwari et al. | 246/246 |
| 2008/0304065 A1 | 12/2008 | Hesser et al. | |
| 2008/0306705 A1 | 12/2008 | Luo et al. | |

OTHER PUBLICATIONS

Unknown, "Videre Design," accessed from http://www.videredesign.com, date unknown, printed on Jan. 30, 2008, 1 page.

Unknown, "Point Grey Research Inc.," accessed from http://www.ptgrey.com, date unknown, printed on Jan. 30, 2008, 1 page.

Unknown, "Selkirk Yard," accessed from http://www.trainweb.org/railnuts/yard.html, date unknown, printed on Dec. 14, 2007, 6 pages.

Shughart et al., "A Comprehensive Decision Support System for Hump Yard Management Using Simulation and Optimization," Innovative Scheduling, Inc., Gainesville, Florida, Aug. 1, 2006, 44 pages.

Sukumar et al., "Robotic Three-Dimensional Imaging System for Under-Vehicle Inspection", Journal of Electronic Imaging, vol. 15, No. 3, 2006, 11 pages.

Michael F. Whalen, PTO Office Action, U.S. Appl. No. 12/043,357, Notification Date Jun. 21, 2011, 21 pages.

Michael F. Whalen, USPTO Final Office Action, U.S. Appl. No. 12/043,357, Notification Date Jan. 12, 2012, 25 pages.

* cited by examiner

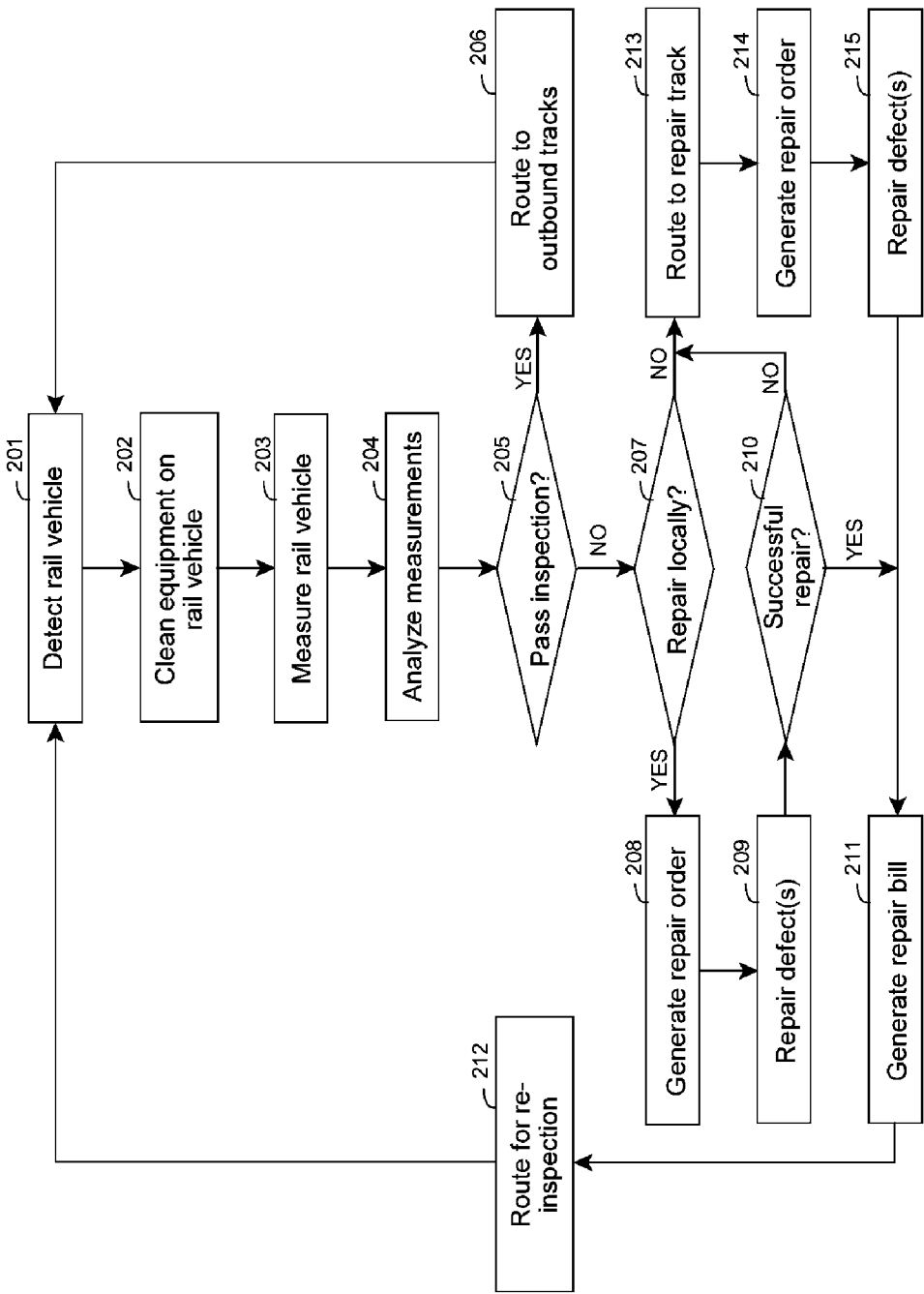

RAIL VEHICLE IDENTIFICATION AND PROCESSING

REFERENCE TO PRIOR APPLICATIONS

The current application claims the benefit of U.S. Provisional Application No. 60/935,575, titled "Description of a system, method, and device for safety and maintenance of rolling stock in a 'hump yard' or other centralized railway environments", which was filed on 20 Aug. 2007, and which is hereby incorporated by reference. Aspects of the disclosure are related to U.S. patent application Ser. No. 12/043,357, titled "Rail vehicle Identification and processing", which was filed on 6 Mar. 2008, and which is hereby incorporated by reference.

TECHNICAL FIELD

The disclosure relates generally to processing rail vehicles, and more particularly, to identifying, acquiring data for, and processing individual rail vehicles.

BACKGROUND ART

During use, railroad wheels are subjected to high, long-term stresses. Despite being made of high-quality steel, the stresses cause the wheels to become worn over a long period of operation. Without maintenance, a wheel can become too thin or otherwise no longer of the correct geometry. Further, the wheels may develop other defects, such as, for example, a "slid flat" or "flat spot", which is caused by locking the wheels with the brakes in an attempt to stop.

The wheels of railroad cars and locomotives cannot turn differentially since they are affixed to solid axles. As a result, any difference between the shape and/or size of the wheels on either side of a car/locomotive can cause a tendency to turn, leading to an increased possibility of derailment. Therefore, it is important to periodically inspect the wheels on railroad cars and locomotives to ensure that they remain safe to operate, both as an individual wheel and as a pair of wheels on the same axle.

The use of a J-shaped, steel wheel gauge is a common approach to inspecting rail wheels. In this approach, an inspector manually places the gauge on the wheel, ensures contact with all relevant portions of the wheel, reads the measurements from marked scales on the gauge, and manually enters the data. Similarly, an electronic wheel gauge can be used, which performs some of the functions automatically, thereby improving accuracy and reducing the overall time spent measuring the wheels. Various illustrative embodiments of handheld electronic wheel gauges are shown and described in U.S. Pat. No. 4,904,939, U.S. Patent Application Publication No. 2005/0259273, and U.S. Patent Application Publication No. 2007/0075192, each of which is incorporated by reference. In both approaches, the inspection is carried out by hand, on one wheel at a time, on a stationary train. To address this limitation, a number of approaches seek to measure rolling stock wheels while they are in motion, detect various defects through the measurements, and record the associated data in an automated fashion. Various illustrative embodiments of such measurement solutions are shown and described in U.S. Pat. Nos. 5,636,026, 6,768,551, 6,523,411, and U.S. Patent Application Publication No. 2007/0064244, each of which is incorporated by reference.

Frequently, rail wheels are inspected at a classification yard (e.g., hump yard, flat-shunted yard, gravity yard, and/or the like). For example, an incoming train may be halted while one or more cars are manually inspected. Often, due to time constraints, only a few cars are actually inspected and/or the inspection is only cursory (e.g., visual inspection). Subsequently, the cars on the incoming train are classified and routed to corresponding tracks for inclusion on an outgoing train. The classification is performed based on a destination for each car. Once an outgoing train is assembled, one or more cars may be manually (e.g., visually) inspected along with an inspection of the brakes for the train. Subsequently, the train will leave the classification yard for the next destination.

SUMMARY OF THE INVENTION

The inventors recognize, among other things, a need for a solution that improves and/or provides the detection of various flaws that are important to the railroad industry and/or provides a coordinated solution for assuring that any defects detected from measured wheels are addressed in a timely and appropriate manner. This need and/or other needs not expressly discussed herein, are met by embodiments of the solution described herein. To this extent, this disclosure describes a management solution in which the overall design enables the proper and timely maintenance of rolling stock (e.g., locomotives, railroad cars, wagons, coaches, etc.). Further, this disclosure discusses various measurement and/or evaluation solutions from one or more of which the management solution can obtain accurate and sufficient data for performing the maintenance in a timely and effective manner.

Aspects of the invention provide a solution for further automating the identification and processing of rail vehicles. Each individual rail vehicle in a series of rail vehicles is identified and data is acquired for the rail vehicle. Identification of each rail vehicle can be implemented using a set of electromagnetic beams that are emitted and detected across a set of rails in such a manner as to enable the reliable identification of individual rail vehicles. Data acquisition for the rail vehicles can include evaluation of one or more parts of the rail vehicle, particularly the rail wheels, for the presence of one or more defects. Data on the part(s), such as rail wheels, can be reliably assigned to a corresponding rail vehicle by also accounting for changes in the direction of movement of the rail vehicle in locations such as a classification yard.

A first aspect of the invention provides a method of processing rail vehicles, the method comprising: identifying each individual rail vehicle as a plurality of attached rail vehicles move along a set of rails using data acquired by at least one sensing device; acquiring measurement data for each identified rail vehicle as it moves along the set of rails from at least one sensing device; analyzing the measurement data for each identified rail vehicle; and automatically routing each identified rail vehicle based on the analyzing.

A second aspect of the invention provides a system for processing rail vehicles, the system comprising: at least one sensing device configured to acquire data as a plurality of attached rail vehicles move along a set of rails; a component configured to identify each individual rail vehicle in the plurality of attached rail vehicles using the data acquired by the at least one sensing device; a component configured to analyze measurement data acquired by the at least one sensing device for each identified rail vehicle; and a component configured to automatically route each identified rail vehicle based on the analyzed measurement data.

A third aspect of the invention provides a method of generating a system for processing rail vehicles, the method comprising: providing a computer system operable to: identify each individual rail vehicle as a plurality of attached rail vehicles move along a set of rails using data acquired by at least one sensing device; acquire measurement data for each identified rail vehicle as it moves along the set of rails from at least one sensing device; analyze the measurement data for each identified rail vehicle; and automatically route each identified rail vehicle based on the analyzing.

A fourth aspect of the invention provides a method of processing rail vehicles, the method comprising: identifying each individual rail vehicle as a plurality of attached rail vehicles move along a set of rails using data acquired by at least one sensing device; and automatically routing each identified rail vehicle to an outbound track based on a destination for the rail vehicle, wherein the automatically routing includes detaching a first rail vehicle from a second rail vehicle using a robotic device.

A fifth aspect of the invention provides a system for processing rail vehicles, the system comprising: at least one sensing device configured to acquire data as a plurality of attached rail vehicles move along a set of rails; a component configured to identify each individual rail vehicle in the plurality of attached rail vehicles using the data acquired by the at least one sensing device; and a component configured to automatically route each identified rail vehicle to an outbound track based on a destination for the rail vehicle, wherein the component configured to automatically route includes a robotic device configured to detach a first rail vehicle from a second rail vehicle in the plurality of attached rail vehicles.

A sixth aspect of the invention provides a method of generating a system for processing rail vehicles, the method comprising: providing a computer system operable to: identify each individual rail vehicle as a plurality of attached rail vehicles move along a set of rails using data acquired by at least one sensing device; and automatically route each identified rail vehicle to an outbound track based on a destination for the rail vehicle, wherein the automatically routing includes detaching a first rail vehicle from a second rail vehicle using a robotic device.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 15 shows an illustrative process for processing rail vehicles through a classification yard according to an embodiment.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for further automating the identification and processing of rail vehicles. Each individual rail vehicle in a series of rail vehicles is identified and data is acquired for the rail vehicle. Identification of each rail vehicle can be implemented using a set of electromagnetic beams that are emitted and detected across a set of rails in such a manner as to enable the reliable identification of individual rail vehicles. Data acquisition for the rail vehicles can include evaluation of one or more parts of the rail vehicle, particularly the rail wheels, for the presence of one or more defects. Data on the part(s), such as rail wheels, can be reliably assigned to a corresponding rail vehicle by also accounting for changes in the direction of movement of the rail vehicle in locations such as a classification yard. As used herein, unless otherwise noted, the term "set" means one or more (i.e., at least one) and the phrase "any solution" means any now known or later developed solution.

In an illustrative application, which is used to describe aspects of the invention herein, a classification yard includes a system for evaluating rolling stock in each of many consists (e.g., one or more connected rail vehicles) of rolling stock. The system can route any rolling stock that is evaluated as including one or more designated defects to a maintenance area, which can address the defect(s) before allowing the rolling stock to be included on a train that is sent out to various destinations for delivery. In this manner, the system can improve: safety by reducing a likelihood of an accident in which one or more of the defects is a contributing cause; efficiency by removing defects that can lead to increased energy expenditure during operation; and/or the like.

Figure 1:
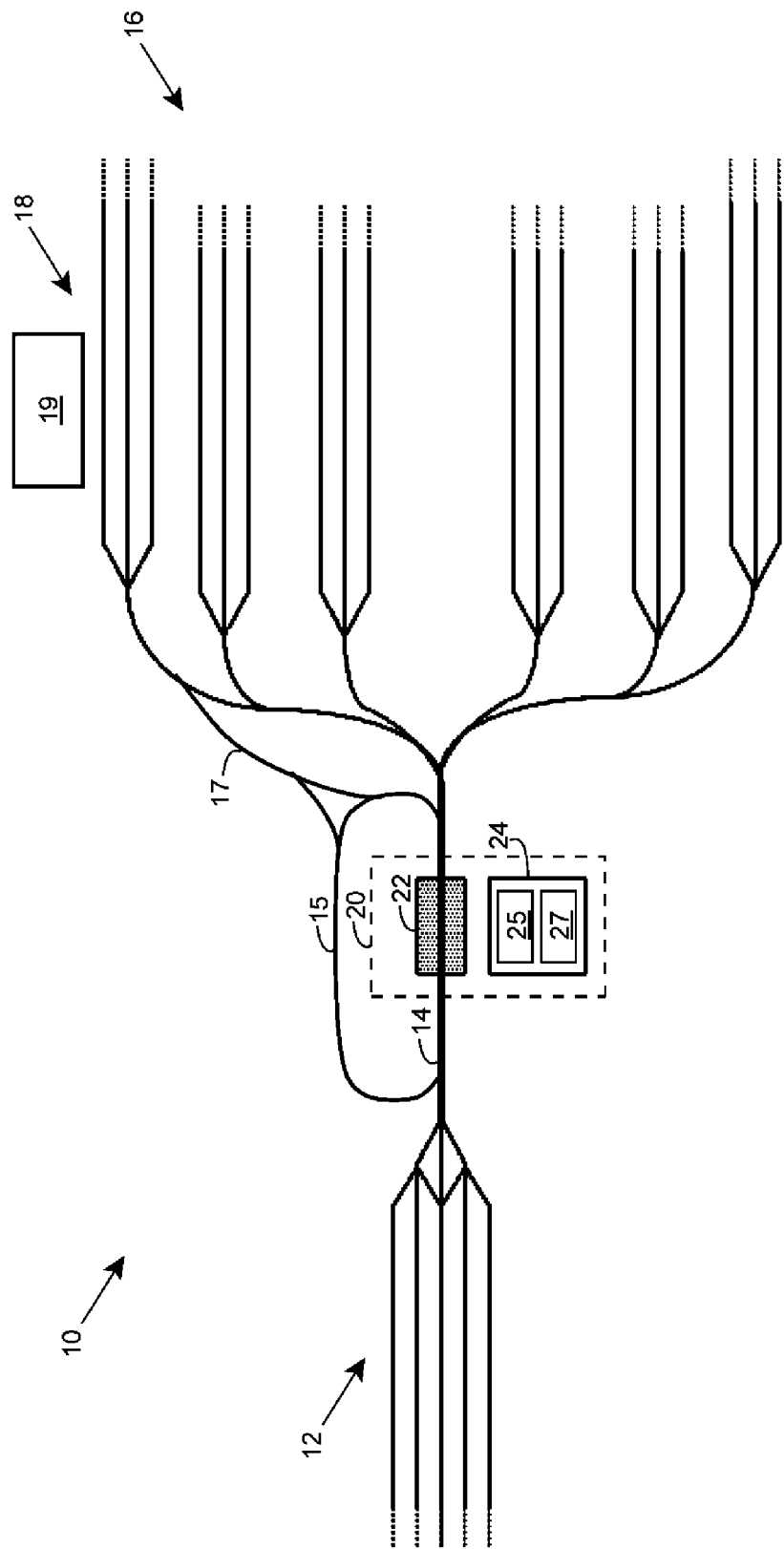
FIG. 1 shows an illustrative simplified diagram of a classification yard according to an embodiment.

FIG. 1 shows an illustrative simplified diagram of a classification yard 10 according to an embodiment. Classification yard 10 includes a number of consist assembly tracks 12 that feed into a single rail line 14. All rail traffic passing through classification yard 10, apart from through traffic, passes along rail line 14. Rail line 14 then diverges into multiple outbound tracks 16. Rolling stock evaluated as having defect(s) that require service is/are routed to a dedicated set of maintenance tracks 18.

Classification yard 10 includes a processing system 20, which can evaluate the rolling stock for the presence of one or more defects and route the rolling stock based on the defect(s) and/or its destination. To this extent, processing system 20 is shown including an evaluation component 22 that automatically acquires measurement data and evaluates various aspects of the rolling stock as it travels along rail line 14. Evaluation component 22 can provide measurement and/or evaluation data to a management component 24, which can route the rolling stock accordingly. Management component 24 can include a computer system that aids in routing the rolling stock (e.g., by designating a track, operating switches to route the rolling stock to the track, and/or the like). A user can be located in a control tower or the like, which can assist the user in overseeing the operations of classification yard 10 while utilizing management component 24 in moving rolling stock through classification yard 10. In this manner, classification yard 10 permits a real-time assignment of good order or bad order evaluation to all passing rolling stock, which further enables more efficient processing of the rolling stock through classification yard 10.

Figure 2:
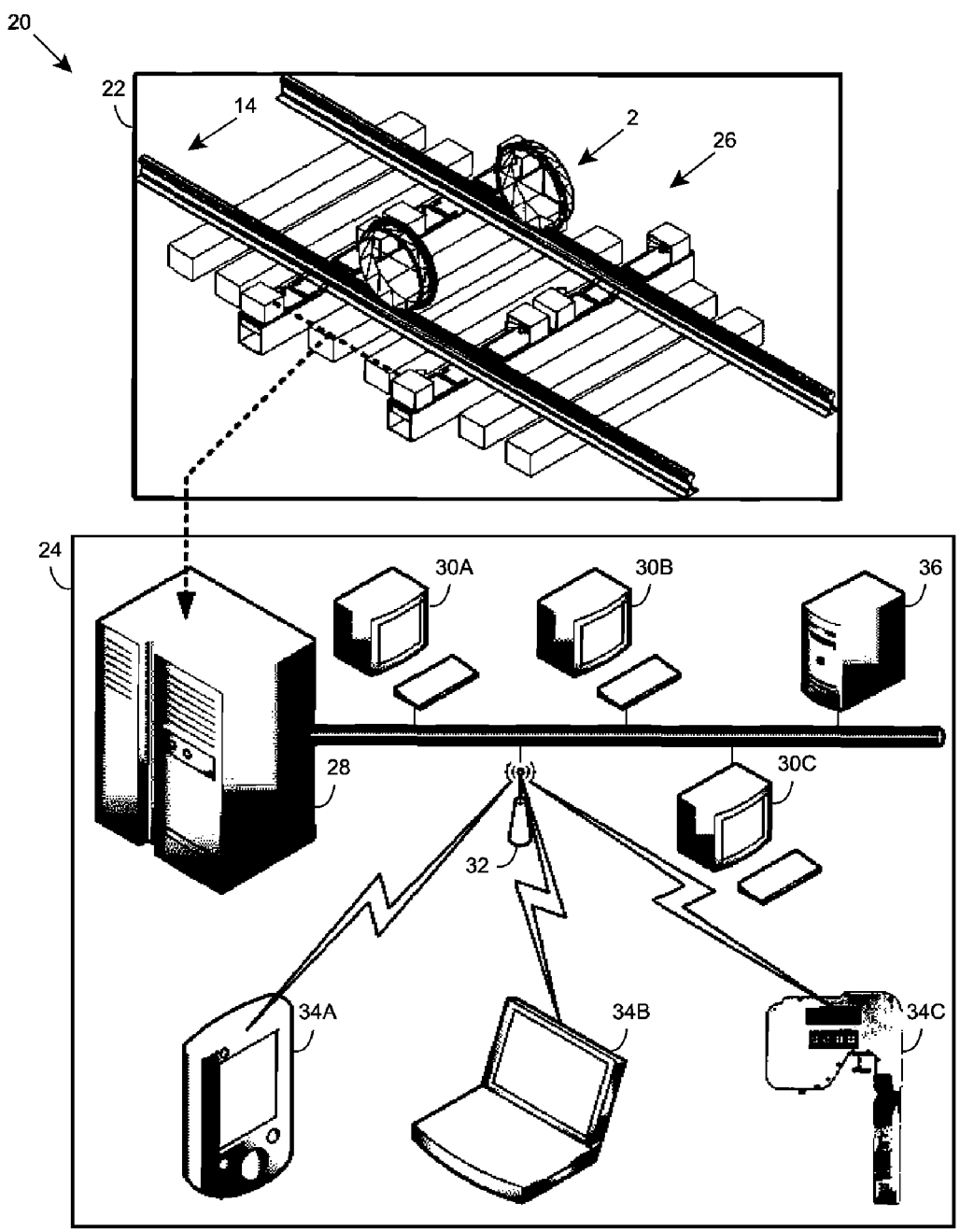
FIG. 2 shows additional details of an illustrative processing system according to an embodiment.

FIG. 2 shows additional details of an illustrative processing system 20 according to an embodiment. In this case, rolling stock moves along rail line 14 on rail wheels 2. As wheels 2 move along rail line 14, a wayside measurement component 26 senses and measures various aspects of wheels 2 using any solution. To this extent, wayside measurement component 26 can include any combination of various forms of sensors, illuminating devices, data-gathering subsystems, and/or communications devices. Wayside measurement component 26 transfers data on wheels 2 for use by management component 24. In an embodiment, wayside measurement component 26 acquires the measurement data, evaluates wheels 2 for the presence of one or more defects, and provides the measurement and/or evaluation data for use by management component 24. Alternatively, wayside measurement component 26 can provide measurement data for wheels 2 for use by management component 24, which evaluates the measurement data for the presence of one or more defects in wheels 2. In any event, wayside measurement component 26 can process, such as filter, enhance, compress, and/or the like, the measurement data prior to providing the measurement data for use by management component 24. Further, while only a single wayside measurement component 26 is shown, it is understood that processing system 20 can include any number and configuration of wayside measurement components 26, which are located adjacent to tracks in any part of classification yard 10 (FIG. 1).

Management component 24 includes a central data processing and storage unit 28, which receives and stores the data acquired by wayside measurement component(s) 26. While shown as a single computing device, it is understood that central data processing and storage unit 28 can comprise multiple computing devices configured in any manner (e.g., one for each wayside measurement component 26) and in communication with one another using any solution. In any event, central data processing and storage unit 28 can process the data received from wayside measurement component(s) 26 to determine whether any of the wheels 2 on the rolling stock moving along rail line 14 require maintenance.

In an embodiment, processing system 20 evaluates the wheels 2 of all passing rolling stock for the presence of one or more defects. Further, processing system 20 can automatically identify each passing rolling stock and identify a location on that rolling stock of the defective wheel(s) 2, if any. To this extent, central data processing and storage unit 28 can manage a defect database that includes an identity of the rolling stock having one or more defects and each specific part defect and its location (e.g., wheel on the rolling stock). Central data processing and storage unit 28 can make the defect database available to maintenance/service (shop) personnel whose job it is to verify and/or repair the defects. Once repaired or evaluated as a false positive, the maintenance personnel can update the defect database and route the rolling stock according to its destination.

To this extent, central data processing and storage unit 28 can communicate with one or more other computer systems located at classification yard 10 (FIG. 1) and/or remote from classification yard 10. For example, management component 24 can include a physical network (e.g., Ethernet, Firewire, USB, and/or the like) that includes various terminal devices 30A-C (e.g, personal computers) located throughout classification yard 10 (e.g., at a maintenance shop). Terminal devices 30A-C can receive data from central data processing and storage unit 28 (e.g., maintenance requirements) and provide data to central data processing and storage unit 28 (e.g., status of maintenance) using any solution. Similarly, a wireless access point 32 can be included to provide wireless connectivity to various portable computing devices 34A-C that are utilized throughout classification yard 10. Portable computing devices 34A-C can include a wireless personal digital assistant (PDA) 34A, a laptop computer 34B, a wireless electronic wheel gauge 34C, each of which can be utilized to receive and/or provide data from/to central data processing and storage unit 28. Still further, central data processing and storage unit 28 and/or a data server 36 (e.g., a web server) can provide access to some or all of the data on central data processing and storage unit 28 to one or more computer systems (e.g., railroad headquarters) remote from classification yard 10 via a public or private network, such as the world wide web.

Processing system 20 can automatically evaluate the condition of rolling stock and the parts thereof with respect to various parameters that are capable of being sensed using any solution. For example, the parameters can include: specific dimensions of a wheel (e.g., diameter, flange thickness, flange height, etc.), which can be detected using any combination of various illumination/sensing solutions; internal flaws (e.g., a crack), which can be detected using various sensing solutions, such as ultrasonic, electromagnetic acoustic transducer(s); external flaws (e.g., slid flats, out of round, etc.), which also can be detected using any combination of various illumination/sensing solutions; axle flaws (e.g., mismatched wheel diameters on an axle), which requires accurate identification of paired wheels and their corresponding measurements; and/or the like.

By automatically detecting and evaluating the rolling stock for the presence of one or more defects, processing system 20 can implement one or more additional functions. For example, management component 24 can: automatically route a vehicle that is evaluated as including one or more defects to maintenance tracks 18 (FIG. 1) without requiring additional human intervention; automatically prepare and/or verify a work order for a vehicle (e.g., including a vehicle identification, particular wheel(s) with defect(s), identification of defect and/or severity of defect, etc.), and forward the work order to the correct personnel (e.g., wheel shop) that will perform the work; automatically upload potential problem cars/wheels to inspector(s) for further evaluation, thereby providing an inspector with a schedule of his/her day's work; automatically update vehicle data based on further evaluation (e.g., manual evaluation by an inspector using, for example, a handheld gauge 34C); automatically update and accumulate a maintenance history of wheel(s) and rolling stock, which can comprise, for example: for each car, a time/type of inspection, location of inspection, wheel/axle/vehicle identifier(s), specific track/direction of car, vehicle speed during inspection, maintenance record, etc.; for each axle, an angle of attack, a back-to-back measurement, etc.; and for each wheel, a rim thickness, diameter, flange width, flange height, detected flaw(s) and flaw data (e.g., how detected, certainty, etc.), etc. Further, management component 24 can enable a user to update a condition of a vehicle/vehicle part after repair, update a part identifier (e.g., when a part is replaced), schedule and/or route the repaired vehicle to an outbound track 16 (FIG. 1) based on its destination, etc.

In order to enable the automated/semi-automated routing and re-routing of rolling stock, it is important to accurately identify each individual rail vehicle in the rolling stock as it moves along rail line 14. For example, when rail wheels 2 are evaluated for the presence of one or more defects, it is important to accurately identify the corresponding rail vehicle on which a potentially defective wheel 2 is located so that the correct rail vehicle is re-routed for maintenance. In an embodiment, an RFID tag is located on each rail vehicle, and is read by wayside measurement component 26 as the rail vehicle passes using any solution. In another embodiment, wayside measurement component 26 captures and processes image data to identify each rail vehicle as it passes using any solution. For example, wayside measurement component 26 can perform segmentation, blob detection, template comparison, and/or the like on image data to enumerate and identify rail vehicles. The decomposition and analysis of images from video in this fashion makes it possible to detect, track, and identify objects of interest within a video image stream. To this extent, an embodiment of wayside measurement component 26 can implement one or more aspects of the monitoring solution shown and described in U.S. Patent Application Publication No. 2005/0258943, which is incorporated by reference.

However, current implementations of each of these identification approaches are limited to some degree. For example, wayside measurement component 26 may fail to activate/read an RFID tag, an RFID tag may not be present/functioning on a rail vehicle, and/or the like. In field observations, the inventors have found an error rate with RFID tags of approximately one percent or more, which is significant for many applications. Similarly, the accuracy with which wayside measurement component 26 can perform image data processing may be susceptible to various environmental conditions (e.g., fog, night vs. day, obstructions, etc.), the speed of the rail vehicles, etc. Still further, manual solutions are susceptible to operator inattentiveness and human error.

Figure 3:
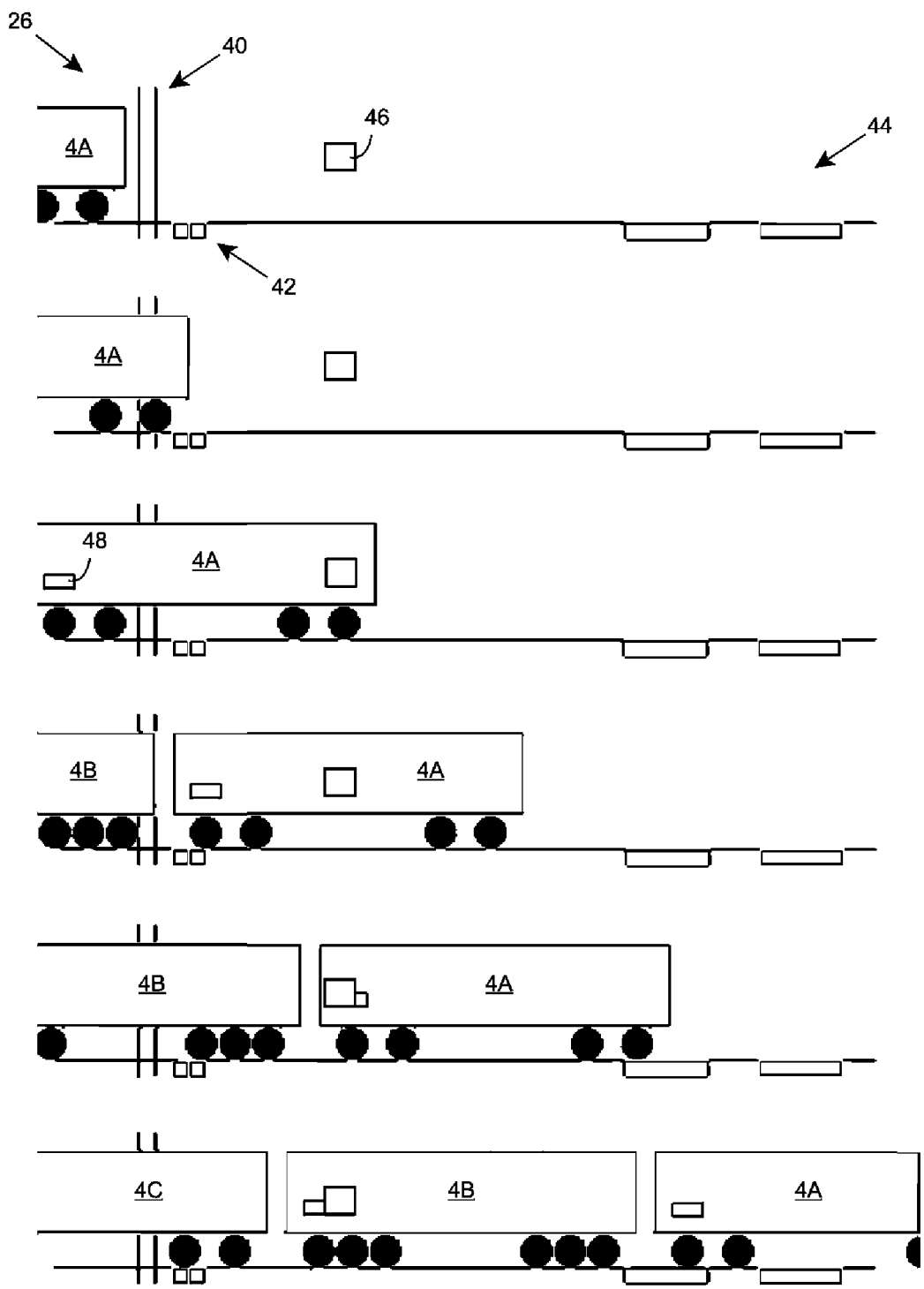
FIG. 3 shows an illustrative wayside measurement component as rolling stock moves past according to an embodiment.

For this purpose, it is preferable to have a self-contained identification solution that can detect the passage of all forms of rail vehicles. Additionally, the identification solution can self-diagnose to assure that it remains operational. To this extent, FIG. 3 shows an illustrative wayside measurement component 26 as rolling stock (rail vehicles 4A-C) moves past according to an embodiment. Wayside measurement component 26 is shown including a vehicle sensing module 40, a wheel sensing module 42, wheel measurement modules 44, and an RFID reader module 46.

In general, as rolling stock, which includes one or more rail vehicles 4A-C, moves toward wayside measurement component 26, a start of a rail vehicle 4A is detected by vehicle sensing module 40, and wayside measurement component 26 can assign a unique identifier to the rail vehicle 4A, which is utilized to manage all data collected for the rail vehicle 4A using any solution. At this time, wayside measurement component 26 can prepare one or more modules, such as wheel measurement modules 44, for data acquisition (e.g., open protective doors, activate lasers or other energy-intensive devices, etc.). Subsequently, wheel sensing module 42 detects the presence of a rail wheel and assigns the detected rail wheel (wheel axle) to the currently detected vehicle 4A using any solution. Wayside measurement component 26 also can assign a unique (at least with respect to each vehicle) identifier for each rail wheel/wheel axle detected for a corresponding rail vehicle 4A using any solution. In any event, wayside measurement component 26 will include measurement and/or evaluation data acquired for each part, such as rail wheel 2, in the data for the corresponding rail vehicle 4A-C using any solution.

As the rolling stock continues to move through wayside measurement component 26, vehicle sensing module 40 will detect an end of rail vehicle 4A and the start of rail vehicle 4B. As a result, wheel sensing module 42 will begin to assign each detected rail wheel to the next vehicle 4B, and a total number of axles for rail vehicle 4A will be known. This process continues for all rail vehicles 4A-C in the rolling stock that pass through wayside measurement component 26. In order to ensure proper operation between vehicle sensing module 40 and rail wheel sensing module 42, it is understood that the various devices should be co-located such that a rail wheel for a previous rail vehicle, e.g., rail vehicle 4A, will not be detected after vehicle sensing module 40 detects the beginning of a subsequent rail vehicle, e.g., rail vehicle 4B.

In any event, as rail vehicles 4A-C move through wayside measurement component 26, RFID reader module 46 can attempt to read RFID tag(s) that may be associated with each rail vehicle 4A-C. If successful, the RFID data can be stored with the other data for the corresponding rail vehicle 4A-C using any solution. Similarly, while not shown, wayside measurement component 26 can incorporate other types of sensing devices, such as an imaging device that is situated such that it has a clear and normally unobstructed view of a rail segment of interest, and which can capture and store visible, infrared, and/or the like, based image data for the rail vehicles 4A-C as they move along the rail segment. Wayside measurement component 26 can process the image data to detect, identify, and/or track rail vehicles 4A-C, acquire additional data, such as markings (e.g., identification serial numbers/words), and/or the like, which can be utilized to verify the identity, ownership, and general nature of the passing rail vehicles 4A-C.

Further, vehicle sensing module 40, wheel sensing module 42, and/or one or more other modules (e.g., an image processing module) can be configured to obtain additional data on rail vehicle 4A, such as its speed, direction of travel, and/or the like. To this extent, using the speed and a known distance of travel, wayside measurement component 26 can calculate an approximate time at which the first wheels of rail vehicle 4A will arrive at wheel measurement modules 44. In this manner, wheel measurement modules 44 can begin operations, such as illuminating an area through which rail wheels will be imaged, in a just-in-time fashion. In any event, once within measurement range, wheel measurement modules 44 can acquire measurement data for the rail wheels using any solution, which wayside measurement component 26 can store with the remaining data for the corresponding vehicle/axle/wheel. It is understood that while two wheel measurement modules 44 are shown, wayside measurement component 26 can include any number of zero or more such measurement modules 44. Further, it is understood that each measurement module 44 can comprise an in-ground system, a wayside system, and/or the like, such as a wheel profiling system, optical wheel flaw detection system, an EMAT wheel flaw detection system, and/or the like.

In an embodiment, vehicle sensing module 40 uses a set of electromagnetic beams that are emitted and detected across the rail(s) on which the rail vehicles 4A-C are moving to identify the beginning/end of each individual connected rail vehicle 4A-C. With such a solution, the electromagnetic beams should be configured in such a manner as to enable the reliable detection of the beginning/end of all types of rail vehicles, including empty flatbeds, regular freight cars, tanker cars, etc. In particular, it is desirable to ensure either that at least one electromagnetic beam path will be clear whenever there is a separation between rail vehicles 4A-C and that no electromagnetic beam path will remain clear whenever a rail vehicle 4A-C of any design is passing through vehicle sensing module 40, or that all electromagnetic beam paths will be clear whenever there is a separation between rail vehicles 4A-C and at least one electromagnetic beam path will be blocked whenever a rail vehicle 4A-C of any design is passing through vehicle sensing module 40.

As many rail vehicles 4A-C have hoses and other accoutrements placed below them, and as the number of wheels on rail vehicles 4A-C may vary (e.g., a tanker may have eight axles, while a flatbed may have four), mounting the emitter and detector at very low levels is not reliable. Further, as the height of a flatbed car can be less than the support structure for other rail vehicles 4A-C such as a tanker, mounting the detectors at a moderately high level is also not reliable. Placing the devices at a level of the lowest rail vehicles 4A-C is also not practical, because the coupler assembly is at the same level, which will also block the beams, resulting in a failure to detect the transition between one rail vehicle 4A-C and the next.

Figure 4:
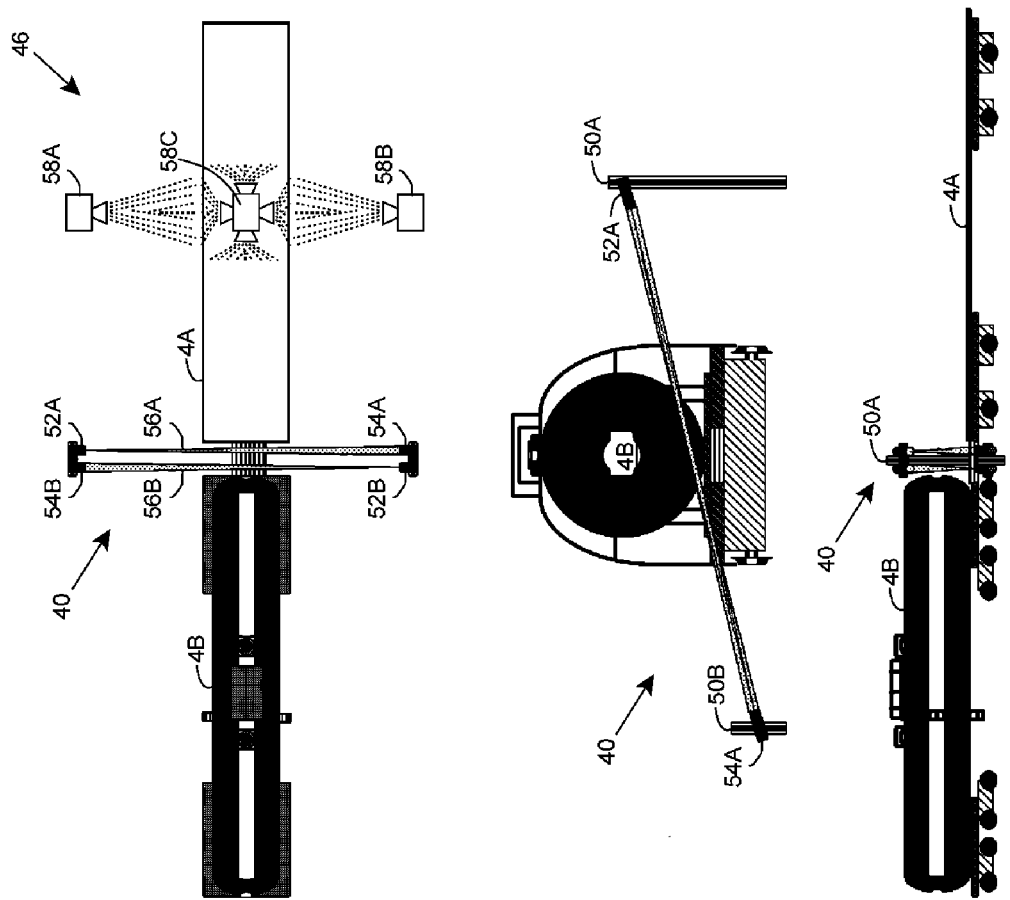
FIG. 4 shows more detailed top, front, and side views of an illustrative vehicle sensing module according to an embodiment.

To this extent, FIG. 4 shows more detailed top, front, and side views of an illustrative vehicle sensing module 40 according to an embodiment. As illustrated, vehicle sensing module 40 includes a first support 50A, e.g., a pole, on a first side of the rails and a second support 50B on an opposite side of the rails. Each support 50A-B is shown including an emitter 52A-B and a detector 54A-B, although it is understood that any arrangement and number of one or more emitter/detector pairs can be utilized. In operation, each emitter/detector pair is configured such that the emitter 52A-B emits a narrow focus electromagnetic beam 56A-B that directly impinges the corresponding detector 54A-B on the opposite side of the rails, which detects the electromagnetic beam 56A-B using any solution. In particular, emitter 52A emits beam 56A, which is detected by detector 54A, while emitter 52B emits beam 56B which is detected by detector 54B using any solution. Each detector 54A-B can generate a different signal/data based on whether the corresponding beam 56A-B is being detected using any solution, which can be processed to determine if there is an obstruction in the path of electromagnetic beam 56A-B. In an embodiment, electromagnetic beams 56A-B comprise narrow focus beams of visible light. However, it is understood that any type of detectable electromagnetic beams can be utilized (e.g., near-infrared, infrared, etc.).

As illustrated, each support 50A-B holds the corresponding devices (emitters 52A-B and detectors 54A-B) at different heights. In particular, support 50B mounts devices 52B, 54A relatively close to the ground, while support 50A mounts devices 52A, 54B relatively high from the ground. Due to the widely varying profiles and accoutrements of rail vehicles, such as rail vehicles 4A-B, the heights and angles of beams 56A-B need to be selected such that they are within a range of heights of beams 56A-B at a center line of the passing rail vehicles 4A-B and a range of angles of beams 56A-B that enable the reliable detection of a gap between two of any of various types of rail vehicles 4A-B. The corresponding heights and distances between supports 50A-B can be selected to both ensure that supports 50A-B and the devices mounted thereon, are not in the path of any rail vehicles 4A-B and ensure that the beams 56A-B pass the center line of rail vehicles 4A-B at a height and with an angle that enables the reliable detection of gaps between rail vehicles 4A-B.

As illustrated, beams 56A-B pass the center line of rail vehicles 4A-B at a height that is sufficient so that a coupler assembly between rail vehicles 4A-B does not block either beam 56A-B. However, the angle of beams 56A-B is such that an outer portion of even a lower profile rail vehicle 4A-B, such as a flatbed 4A, will block the paths of beams 56A-B. Since all coupler assemblies should be able to couple with all others on a given railroad, the height of the beams 56A-B as they pass the coupler assembly can be selected based on the known height of the assemblies (e.g., to travel a few inches above the assembly). Similarly, since the dimensions (including height and width) of the lowest/narrowest possible rail vehicle 4A-B is known, the angle of the beams 56A-B can be selected to impinge the rail vehicle 4A-B after passing over the coupler assembly at the selected height using any solution.

It is understood that vehicle sensing module 40 can utilize any number of one or more beams 56A-B to detect rail vehicles 4A-B. When two or more horizontally spaced beams 56A-B are used, vehicle sensing module 40 can acquire additional data on rail vehicles 4A-B, such as a direction of travel, a speed, and/or the like. Additionally, when available, it is understood that additional data can be combined with the data acquired using vehicle sensing module 40 to verify proper operation of wayside measurement component 26. For example, wayside measurement component 26 can implement multiple solutions (e.g., image-based, RFID tag-based, and/or the like) to individually identify rail vehicles 4A-B, determine a speed, direction of travel, type of vehicle, etc., the results of which wayside measurement component 26 can cross-reference and compare. When different results are acquired, wayside measurement component 26 can determine a most likely result, flag the discrepancy for human review, and/or the like, using any solution. To this extent, wayside measurement component 26 can use a minimum blockage time to filter/ignore false readings due to a passage of a bird flying, animal walking, hose above the coupler assembly, and/or the like.

Returning to FIG. 3, as discussed herein, wayside measurement component 26 can be implemented as part of a classification yard. To this extent, rail vehicles 4A-B may be moving at a slow speed (e.g., approximately 1.5 miles/hour or less), may temporarily stop, and may change direction in travel while they are being processed through the classification yard. The slow speed operation also enables rail vehicles 4A-C to undergo greater changes in speed as compared to higher speed operation for the same distance, making a prediction of an arrival of a rail wheel at measurement module(s) 44 less certain. In order to acquire accurate data on each rail vehicle 4A-B (e.g., number of axles, operating condition of rail wheels, etc.) in this operating environment, it is important for wayside measurement component 26 to be able to account for these motion changes when processing the rail vehicles (e.g., identifying individual vehicles, acquiring data on each vehicle, processing each vehicle, etc.).

An embodiment of vehicle sensing module 40 can account for the change in direction by determining an order in which beams 56A-B (FIG. 4) are blocked by a passing rail vehicle 4A-C. However, changes in the direction of movement may be only temporary, and may not cause rail vehicles 4A-C to move sufficiently for a gap between two rail vehicles 4A-C to be detected by vehicle sensing module 40. While image data, RFID data, and the like, also can be used to determine the direction of travel of rail vehicles 4A-C, it may be desirable for wheel sensing module 42 to be able to determine the direction that rail vehicles 4A-C are traveling to reduce the risk of assigning a detected rail wheel to an incorrect rail vehicle 4A-C.

Figure 5:
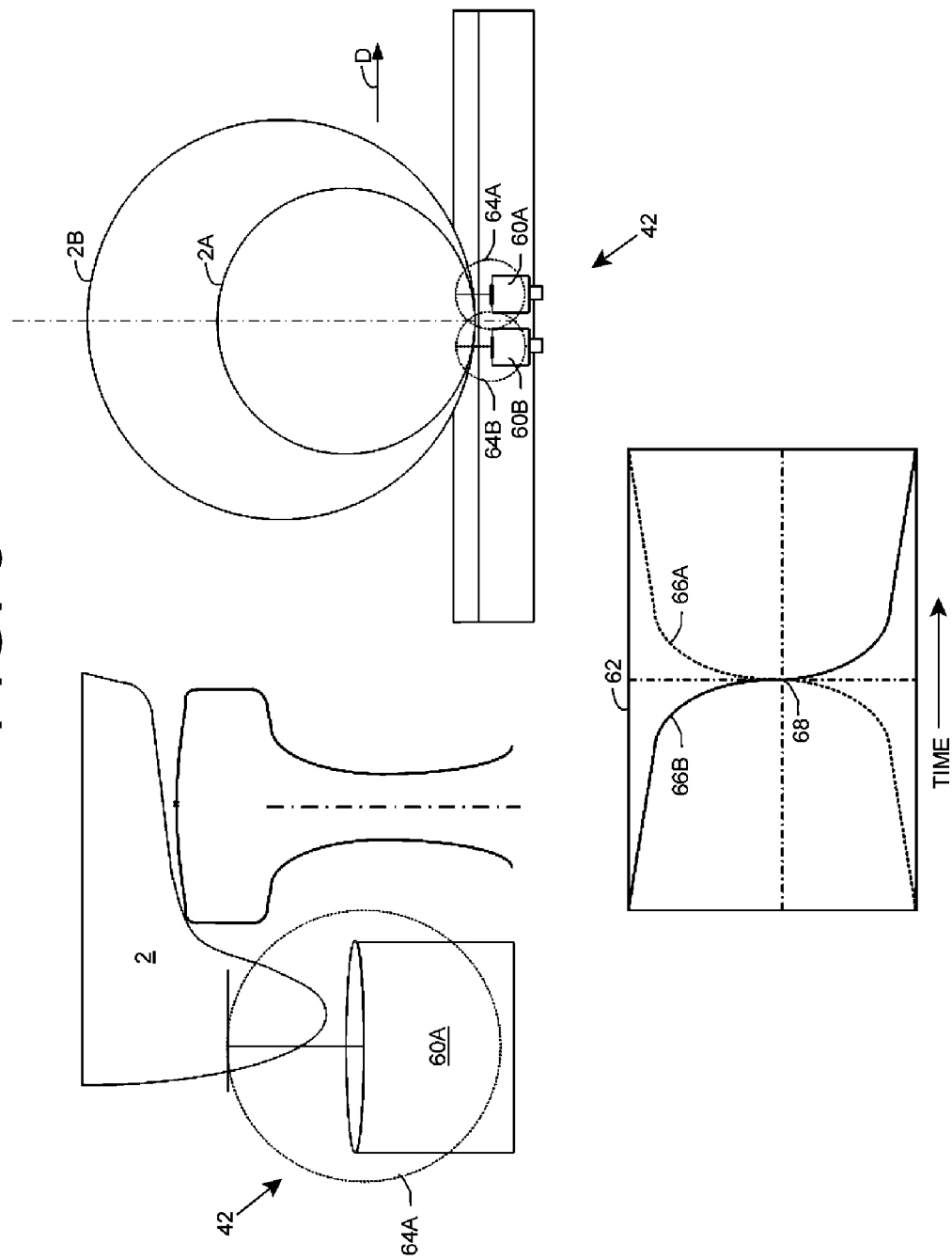
FIG. 5 shows operation of an illustrative wheel sensing module according to an embodiment.

To this extent, FIG. 5 shows operation of an illustrative wheel sensing module 42 according to an embodiment. In particular, FIG. 5 shows a head on and side perspective view of wheel sensing module 42 as well as an illustrative output 62 generated by a pair of proximity sensors 60A-B included in wheel sensing module 42. In an embodiment, each proximity sensor 60A-B comprises an inductive sensor. However, any type of sensor capable of detecting the approach and movement of rail wheel 2 (e.g., the flange of rail wheel 2) through a sensing range 64A-B can be used, such as, but not limited to sensors that operate based on electromagnetic, optical, or mechanical principles. Further, it is understood that such sensors can be selected and/or designed to compensate for and/or be unaffected by, the various electromagnetic fields present in the railroad environment (such as those generated by the AC systems of locomotives) using any solution.

Wheel sensing module 42 can determine when a rail wheel 2 of any of a range of circumferences, as indicated by rail wheels 2A-B, is at an exact position, e.g., "top dead center", over proximity sensors 60A-B. Further, wheel sensing module 42 can determine a direction of travel of the rail wheel 2. As illustrated, as rail wheel 2 rides along a rail, its flange will pass over proximity sensors 60A-B. Each proximity sensor 60A-B has a sensing range 64A-B, which is sufficient to sense flanges of a wide range of sizes. Further, since the corresponding sensing ranges 64A-B encompass a volume of space, not merely a line, proximity sensors 60A-B can be used to detect a relative location of rail wheel 2 with respect to proximity sensors 60A-B. While sensing ranges 64A-B are shown as having a spherical shape centered on the corresponding proximity sensor 60A-B, it is understood that proximity sensors 60A-B could have a sensing range 64A-B of any shape.

Regardless, proximity sensors 60A-B are positioned such that as a rail wheel 2 passes through the center of the sensor range, such as sensor range 64B, of one proximity sensor 60B, it begins to enter the sensor range 64A of the other proximity sensor 60A. A rail wheel 2 entering and leaving the sensor range 64A-B of either proximity sensor 60A-B will generate a symmetric signal curve. To this extent, as a rail wheel 2 moves in direction D over proximity sensors 60A-B, curves 66A-B will be generated by proximity sensors 60A-B. In particular, curve 66B is generated by proximity sensor 60B and is shown from the point at which rail wheel 2 has passed the center of sensor range 64B to the point at which rail wheel 2 moves out of sensor range 64B. Similarly, curve 66A is generated by proximity sensor 60A and is shown from the point at which rail wheel 2 enters sensor range 64A to the point at which rail wheel 2 is at the center of sensor range 64A. In this case, the centers of proximity sensors 60A-B are separated by the sensor range to generate the two curves, which coincide exactly in time.

Since curves 66A-B are substantially identical (as may be permitted by physical design limitations) and are symmetrical, the point 68 at which curves 66A-B intersect corresponds to the time when rail wheel 2 is precisely in between the two proximity sensors 60A-B. Consequently, wheel sensing module 42 can determine the time at which rail wheel 2 is at an exact position, e.g., top dead center, by plotting curves 66A-B and noting the intersection point 68. Further, by determining which sensor range 64A-B that rail wheel 2 enters first, wheel sensing module 42 can determine a direction of travel of rail wheel 2 using any solution. Using this information, wayside measurement component 26 can increment and/or decrement a count of axles no matter how many times rolling stock may reverse direction, thereby producing an accurate axle count for the rolling stock. Still further, curve(s) 66A-B will have a substantially horizontal (non-zero) portion when rail wheel 2 stops within a corresponding sensor range(s) 64A-B, which wayside measurement component 26 can utilize to adjust the operation of one or more modules, such as turning off or pausing the operation of measurement module(s) 44 (FIG. 3).

Returning to FIG. 3, each measurement module 44 can acquire various types of data for each rail vehicle 4A-C and/or one or more parts thereof using any solution. To this extent, measurement module(s) 44 can obtain various measurements of the rail wheels for each rail vehicle 4A-C, which can be used to evaluate the rail wheel for at least one defect. For example, measurement module 44 can acquire rail wheel data that includes: a circumference, a flange height/width, etc., using any solution, such as the projection and imaging of a number of laser/light lines on the rail wheel.

Figure 6:
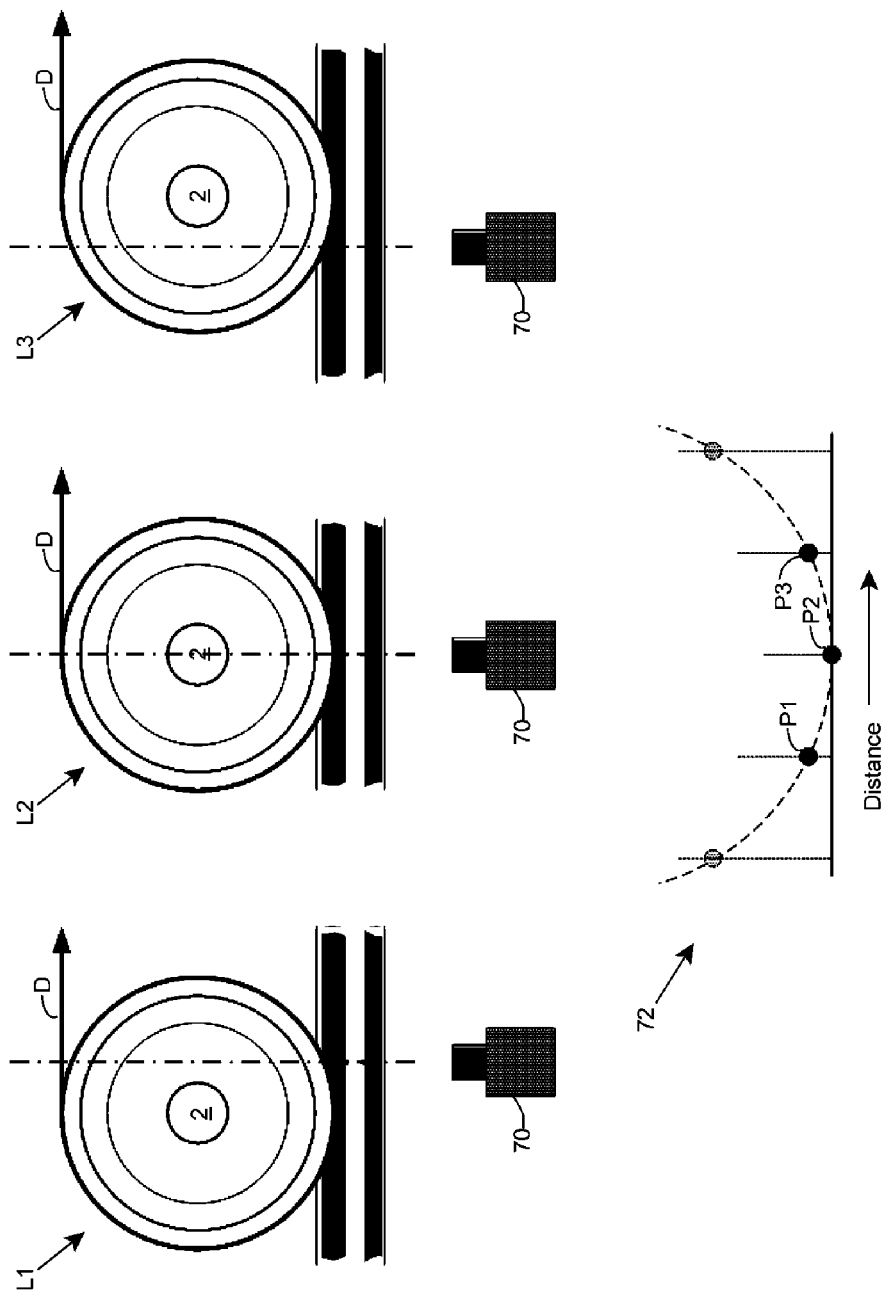
FIG. 6 shows an illustrative solution for measuring a diameter of a rail wheel using a single camera according to an embodiment.

FIG. 6 shows an illustrative solution for measuring a diameter of a rail wheel 2 using a single camera 70 according to an embodiment. In this case, wheel 2 is shown located at three locations L1, L2, L3 as it moves in direction D. At each location L1-3, wheel 2 is imaged by a high-speed camera 70 and the location (e.g., height) of an edge (e.g., flange) of wheel 2 with respect to a centerline of camera 70 is measured. By obtaining a speed of wheel 2 as it passes over camera 70 using any solution and a time interval between the captured images, measurement module 44 (FIG. 3) can determine a distance traveled by wheel 2 between consecutive images captured by camera 70. Using the distance and the location of wheel 2 with respect to the centerline of camera 70, measurement module 44 can generate a plot 72 that includes points P1, P2, P3, each of which corresponds to location L1, L2, L3, respectively. Measurement module 44 can use a curve fitting algorithm to fit points Pi-3 (or additional points, if available) to a curve, which measurement module 44 can use to obtain a diameter measurement of rail wheel 2 using any solution. Since rail wheel 2 is round by default, and very few normal wear defects will change this in the case of the flange (which can comprise the imaged portion), measurement module 44 can assume a circular profile fitted to the known plotted points P1-3 to yield a good value for the diameter of the rail wheel 2. While wheel 2 is shown being imaged at top dead center of the center line (location L2), it is understood that any sequence of images in which an appropriate set of points can be located can provide sufficient data to implement the curve fitting algorithm.

Measurement module 44 may use the diameter of rail wheel 2, if of sufficient accuracy (e.g., dependent on the resolution and speed of camera 70), as a measured attribute of rail wheel 2 and/or use it to confirm the measurements and/or adjust the operation of other devices/modules in measuring attribute(s) of rail wheel 2. For example, measurement module 44 may implement an image-based measurement solution that projects laser lines that are configured to pass radially through a center of a 36" diameter rail wheel 2. However, for a 40" diameter rail wheel 2, the projected lines will pass below the center of the wheel, while the projected lines will pass above the center of a 33" diameter rail wheel 2. By knowing an approximate diameter of rail wheel 2, measurement module 44 can adjust the expected geometry of the measured wheel 2, which can yield a more reliable and accurate measurement than would otherwise be possible.

Figure 7:
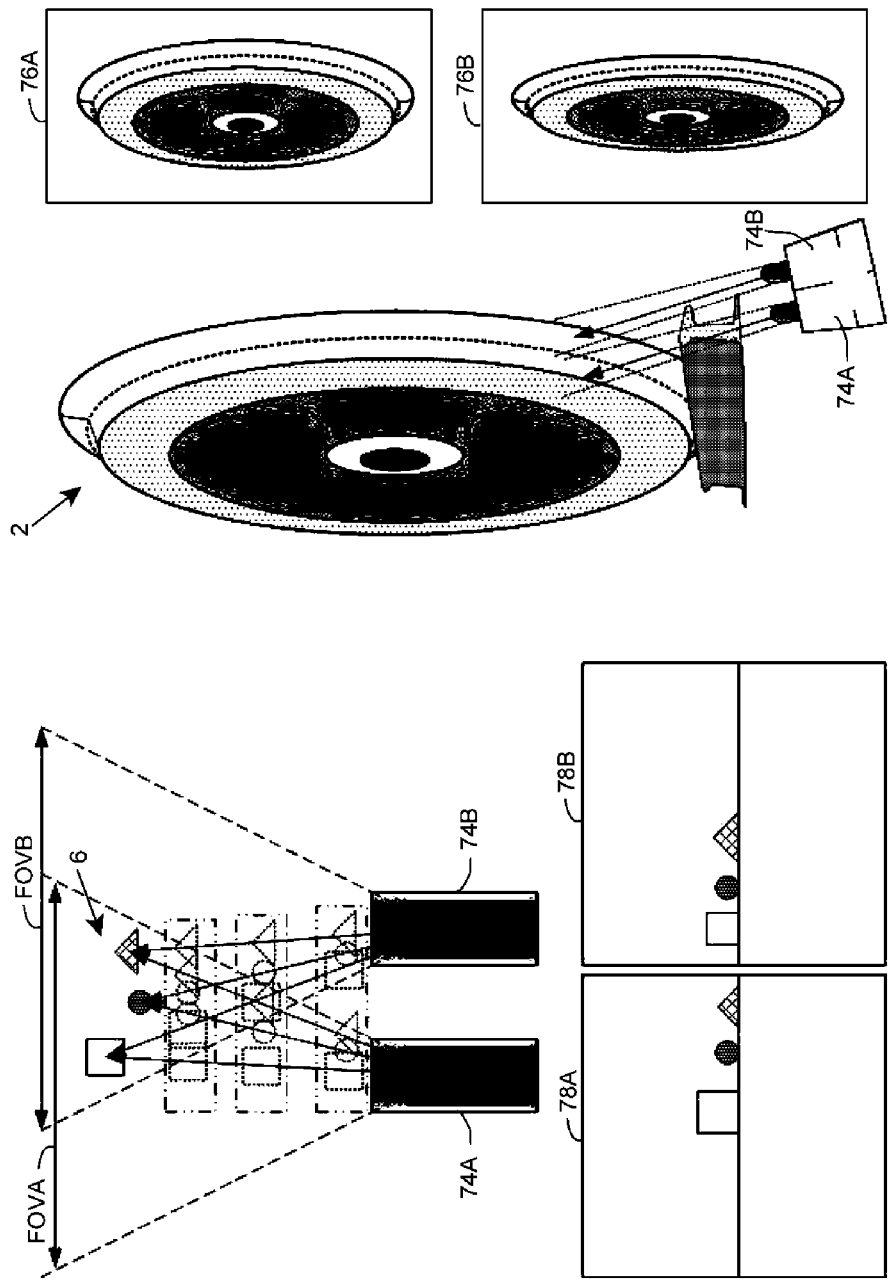
FIG. 7 shows an illustrative solution for acquiring image data of a rail wheel according to an embodiment.

In order to successfully obtain accurate measurement(s) of various wheel parameters, measurement module 44 can construct a mathematically accurate model of the wheel from image data. For example, FIG. 7 shows an illustrative solution for acquiring image data of a rail wheel 2, which measurement module 44 can use to construct a mathematically accurate model of rail wheel 2, according to an embodiment. In general, a pair of identical cameras 74A-B are fixed in a known physical relationship to one another, e.g., a known distance apart and imaging in a coplanar fashion with overlapping fields of view FOVA, FOVB. In this manner, cameras 74A-B will image the same scene in the overlapping portion, from slightly differing viewpoints. As a result, objects 6 that are located in the overlapping area of fields of view FOVA, FOVB, will appear in different locations and/or have different sizes in the corresponding images 78A-B captured by cameras 74A-B, respectively. As the distances between the cameras' 74A-B viewpoints are known exactly, measurement module 44 can use triangulation and mapping, to determine from these "stereo" images the actual position in space that objects 6 occupy in order to result in images 78A-B.

The same principles can be applied by measurement module 44 when acquiring measurement data for rail wheel 2. In particular, measurement module 44 can include cameras 74A-B, which are configured to acquire images 76A-B, respectively, of rail wheel 2 as it moves along the rail. As illustrated, cameras 74A-B can be located on an opposite side of the rail as the flange of rail wheel 2, which can enable the tread surface of rail wheel 2 to be imaged. Further, cameras 74A-B can be placed a known distance apart, and simultaneously capture images 76A-B in a coplanar fashion with overlapping fields of view. Measurement module 44 can perform the appropriate calculations (e.g., triangulation and mapping) based on the known geometry to yield a mathematical model of rail wheel 2, which measurement module 44 can use to determine the measurements for rail wheel 2.

Figure 8:
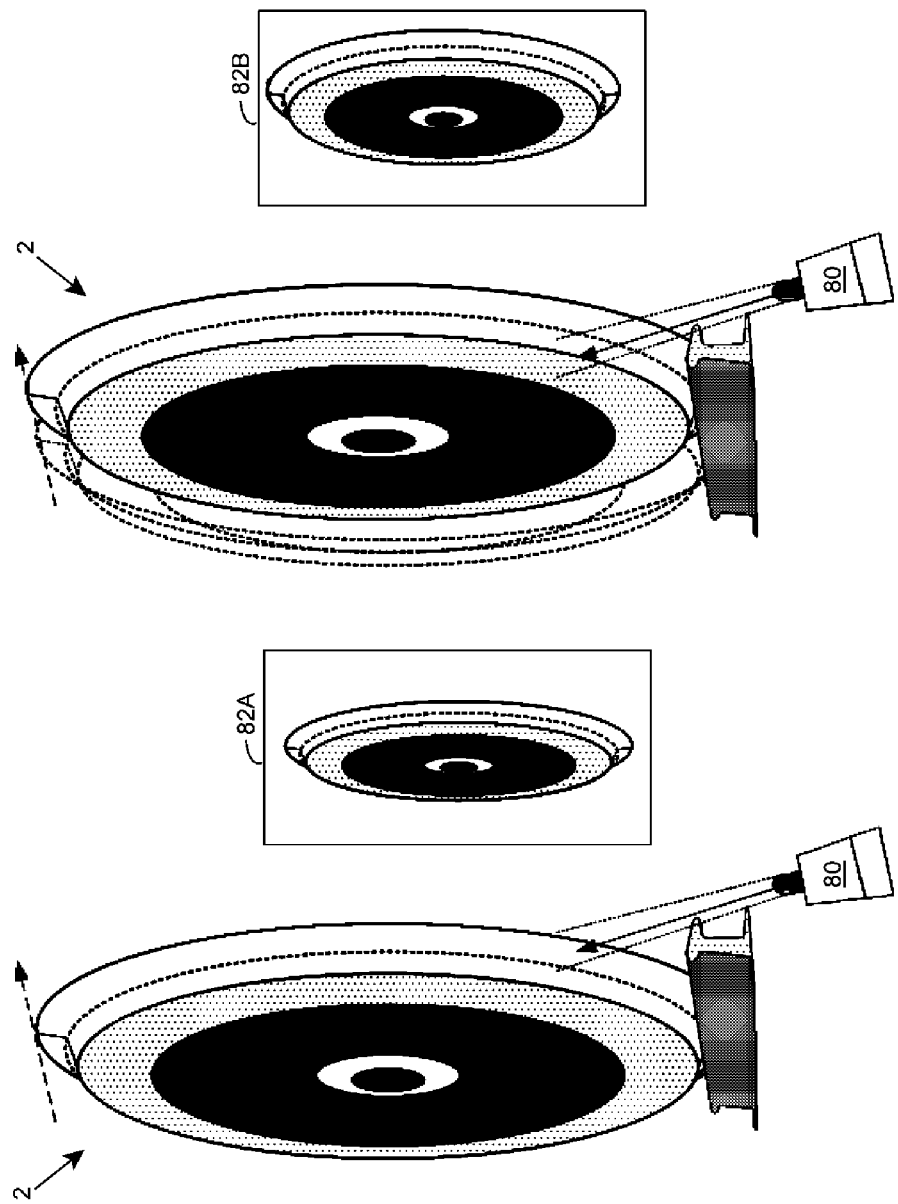
FIG. 8 shows another illustrative solution for acquiring image data of a rail wheel according to an embodiment.

Similarly, measurement module 44 can use multiple images captured by a single camera to construct a mathematical model of rail wheel 2. To this extent, FIG. 8 shows another illustrative solution for acquiring image data of a rail wheel 2, which measurement module 44 can use to construct a mathematically accurate model of rail wheel 2, according to an embodiment. In this embodiment, camera 80 can be located on an opposite side of the rail as the flange of rail wheel 2 in a known position with respect to the rail and a known field and direction of view. Camera 80 acquires two images 82A-B of rail wheel 2 as it moves along the rail. The movement of rail wheel 2 between the time that the two images 82A-B are acquired, causes the field and direction of view of camera 80 in the second image 82B to impinge upon rail wheel 2 in a location farther along rail wheel's 2 side as compared to the first image 82A. Measurement module 44 can obtain a speed of rail wheel 2 and a time between images 82A-B to determine a distance traveled by rail wheel 2 between images 82A-B. Using this distance, measurement module 44 can perform the appropriate calculations (e.g., triangulation and mapping) to yield a mathematical model of rail wheel 2, which measurement module 44 can use to determine the measurements for rail wheel 2. It is understood that while two images are shown and described in FIGS. 7 and 8, measurement module 44 can use any number of two or more images to improve and refine the mathematical model of rail wheel 2.

Figure 9:
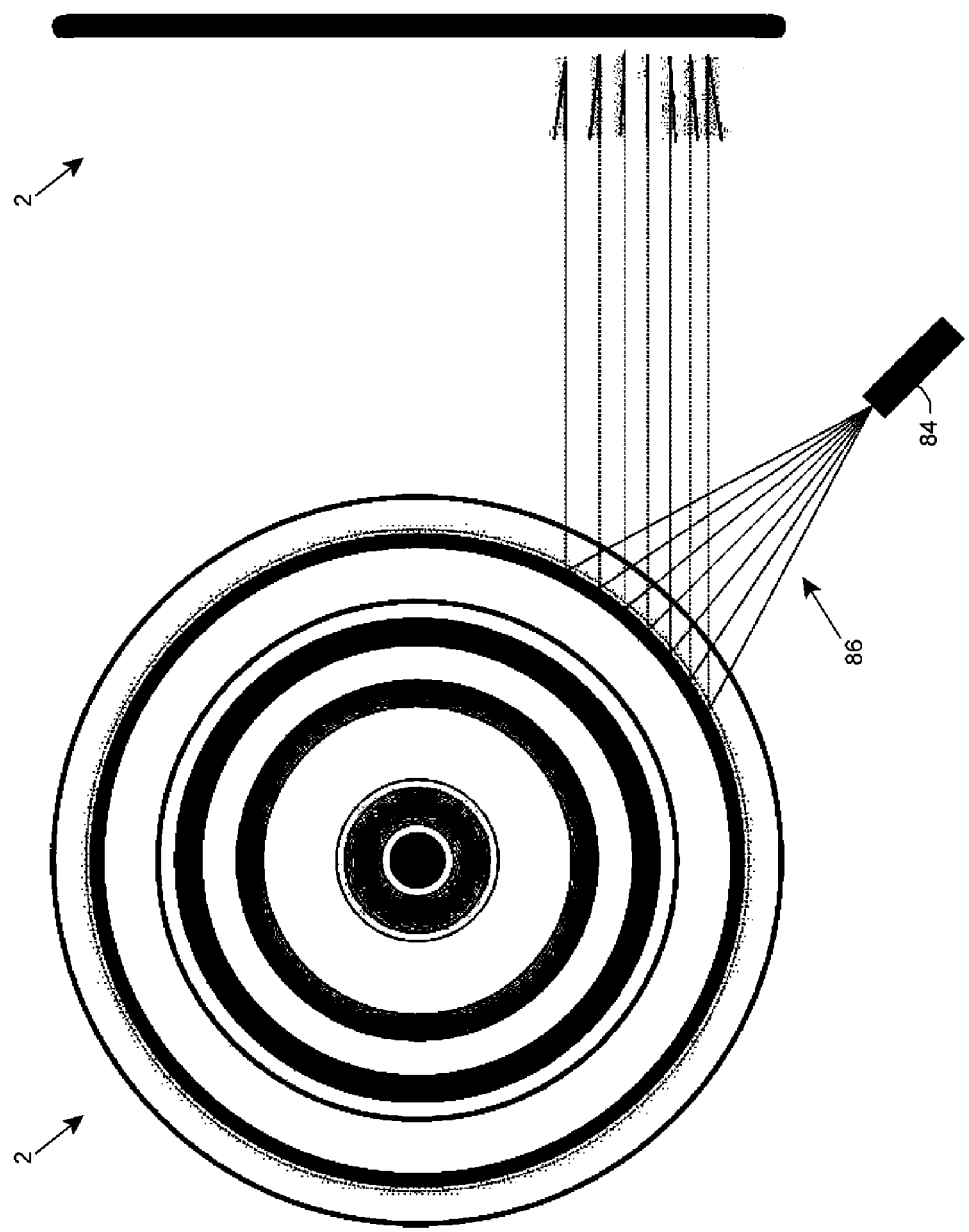
FIG. 9 shows side and front views of an illustrative solution for illuminating a tread surface of a rail wheel with lines according to an embodiment.

When measurement module 44 projects lines onto rail wheel 2 to obtain image data for wheel measurements of rail wheel 2, measurement module 44 can project the lines along a side of rail wheel 2 and obtain measurement data using any solution. Further, measurement module 44 can project lines at an oncoming rail wheel 2 in a manner such that an incidence of the lines is primarily along/across a tread (contact) surface of rail wheel 2. To this extent, FIG. 9 shows side and front views of an illustrative solution for illuminating a tread surface of a rail wheel 2 with lines 86 according to an embodiment. As illustrated, a set of laser generators 84 produce a plurality of parallel laser lines 86 having a known angular separation, which is the same for each pair of adjacent laser lines 86. When projected onto rail wheel 2, the angle and separation of the lines 86 will be distorted in a manner that is mathematically related to the degree and nature of the curve and slant of rail wheel 2 as illustrated in the front view of rail wheel 2.

When imaged by a camera (not shown) located adjacent to laser generator(s) 84, the separation of the lines 86 will differ based on the curve of the tread surface of rail wheel 2. In particular, the lines 86 toward an upper portion of rail wheel 2 will be further separated than the lines 86 toward a bottom portion of rail wheel 2. Further, the lines 86 will be angled due to the slant of rail wheel 2. Since the intersection of lines 86 with rail wheel 2 varies in a known geometric manner, and the projection and imaging of laser lines can be done with known geometric relationships between laser generator(s) 84, rail wheel 2, and the camera, measurement module 44 can use the image data to generate a mathematical model of the tread surface of rail wheel 2 using any solution.

Figure 10:
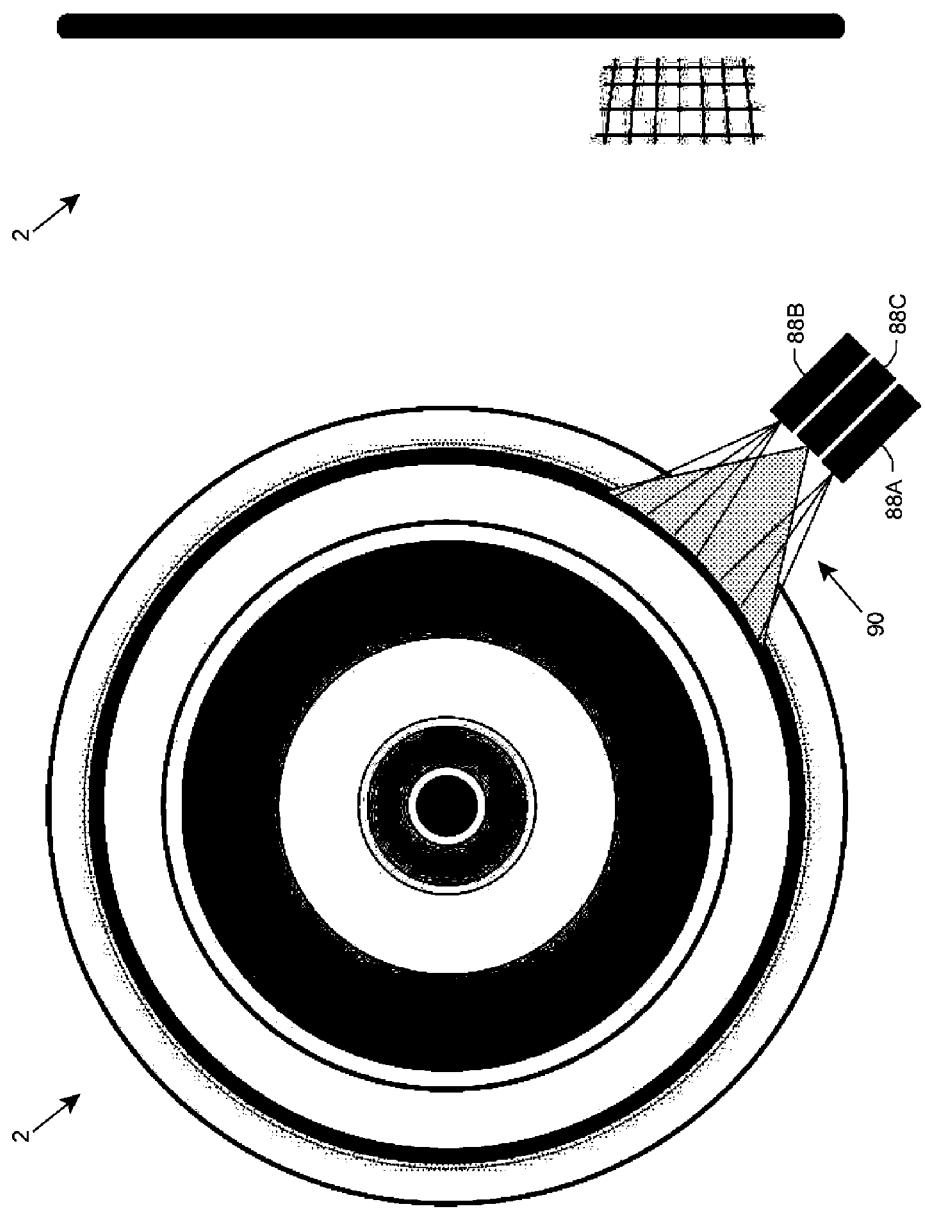
FIG. 10 shows side and front views of another illustrative solution for illuminating a tread surface of a rail wheel with lines according to an embodiment.

While a single laser generator 84 is shown producing the laser lines 86, it is understood that any number of laser generators 84, each of which generates one or more laser lines 86, can be utilized. Further, while laser lines 86 are substantially parallel and have the same separation angle, it is understood that any configuration of lines 86 can be utilized. To this extent, FIG. 10 shows side and front views of another illustrative solution for illuminating a tread surface of a rail wheel 2 with lines 90 according to an embodiment. In this embodiment, laser generators 88A-B are shown projecting horizontal sets of substantially parallel lines, while laser generator 88C projects a vertical set of substantially parallel lines. In this manner, laser generators 88A-C project laser lines 90 that form a grid pattern on the tread surface of rail wheel 2. As discussed above, measurement module 44 can use the distortion and spacing of the grid pattern to calculate the shape of the illuminated portion of rail wheel 2 and generate a mathematical model of rail wheel 2, which measurement module 44 can use to derive a set of measurements for rail wheel 2.

It is understood that measurement module 44 can utilize lines having any of various geometric forms, including for example, cross hair(s). Further, measurement module 44 can include any of various numbers of laser generators, positioning and aiming of laser generators, geometric forms produced by laser generators, and/or the like. Still further, measurement module 44 can use other non-laser illumination solutions, including use of ambient radiation (e.g., visible light, near-infrared, infrared, ultraviolet, and/or the like), non-coherent light (e.g., diffuse constant illumination, strobe/flash lighting, and/or the like), and/or the like, in combination with or alternatively to the use of laser light. Still further, measurement module 44 can utilize modification(s) to the rail, such as inclusion of a reflective material, or other aspects of the imaging environment to enhance a contrast between rail wheel 2 and the remainder of the imaged area.

Returning to FIGS. 1-3, while wayside measurement component 26 has been primarily shown and described as including measurement module(s) 44 for capturing image data on rail wheels of rail vehicles 4A-C, it is understood that measurement module(s) 44 can capture other types of data on rail vehicles 4A-C in addition to or alternatively to image data on rail wheels. For example, a measurement module 44 can: acquire data (e.g., using an under-track video system) for evaluating an operating condition of various suspension components; acquire data (e.g., using an acoustic analysis system) for detecting failing bearings; and/or the like. To this extent, in an embodiment, measurement module 44 can include a system as shown and described in U.S. patent application Ser. No. 11/748714, titled "Vehicle evaluation using infrared data", which was filed on 15 May 2007, and which is incorporated by reference. In this case, measurement module 44 can evaluate brake components, bearings, brake leakage, and/or the like, by identifying anomaly(ies) in the infrared data. Similarly, measurement module 44 can include various sensors that enable the detection of over height/extra wide loads (e.g., using light beam(s), metal sensor(s), image processing, and/or the like).

Further, wayside measurement component 26 can acquire other data on the rail environment. For example, wayside measurement component 26 can include a set of video cameras (visible light, near-infrared, infrared, or the like), which can acquire video data that management component 24 can process to provide security and/or safety monitoring using any solution. As processing system 20 would already be tracking the approach of trains, processing system 20 can further utilize video information, especially in remote areas or critical locations, to detect potential unauthorized activity in the neighborhood of the track. For example, the camera(s) could monitor the switches in the area, and management component 24 can alert relevant authorities, if image analysis detects a potentially unauthorized person or vehicle at or near the switch. Processing system 20 could identify authorized personnel in a number of ways, e.g., by carrying a "smart ID" tag which could be detected by a reader in the vicinity of the critical rail components. Additionally, measurement module 44 can implement automated/semi-automated/manual inspections of additional features of rail vehicles 4A-C, such as safety appliances (e.g., ladders), based on the video/image data using any solution.

Further, it is understood that wayside measurement component 26 can be implemented in any location and/or in any manner. For example, measurement module(s) 44 may already be utilized at a classification yard, or the like. In this case, additional module(s), such as vehicle sensing module 40 and/or wheel sensing module 42, component(s), such as management component 24, and/or the like, can be added and integrated with measurement module(s) 44 to enable the functionality described herein.

The inspection of connected rail vehicles can include an inspection of the various coupling mechanisms between two rail vehicles. Additionally, diverting a vehicle from a consist to another track requires that the vehicle be detached from the other vehicles in the consist. Further, the repair can include a repair of one or more minor defects (e.g., reattachment of a brake line) with the couplings. These tasks are inherently dangerous, as they may require that a worker get between two vehicles in a consist, which may be moving constantly, or suddenly stop or start without warning in classification yard 10. Even a very small movement by a 300,000 pound rail vehicle can be potentially lethal for a worker between two vehicles at that moment. To date, it remains necessary for human workers to step between the vehicles and detach/attach various connectors (coupling mechanisms, brake hoses, etc.) when assembling or disassembling a consist, performing a repair, detaching a bad-ordered vehicle, and/or the like.

Figure 11:
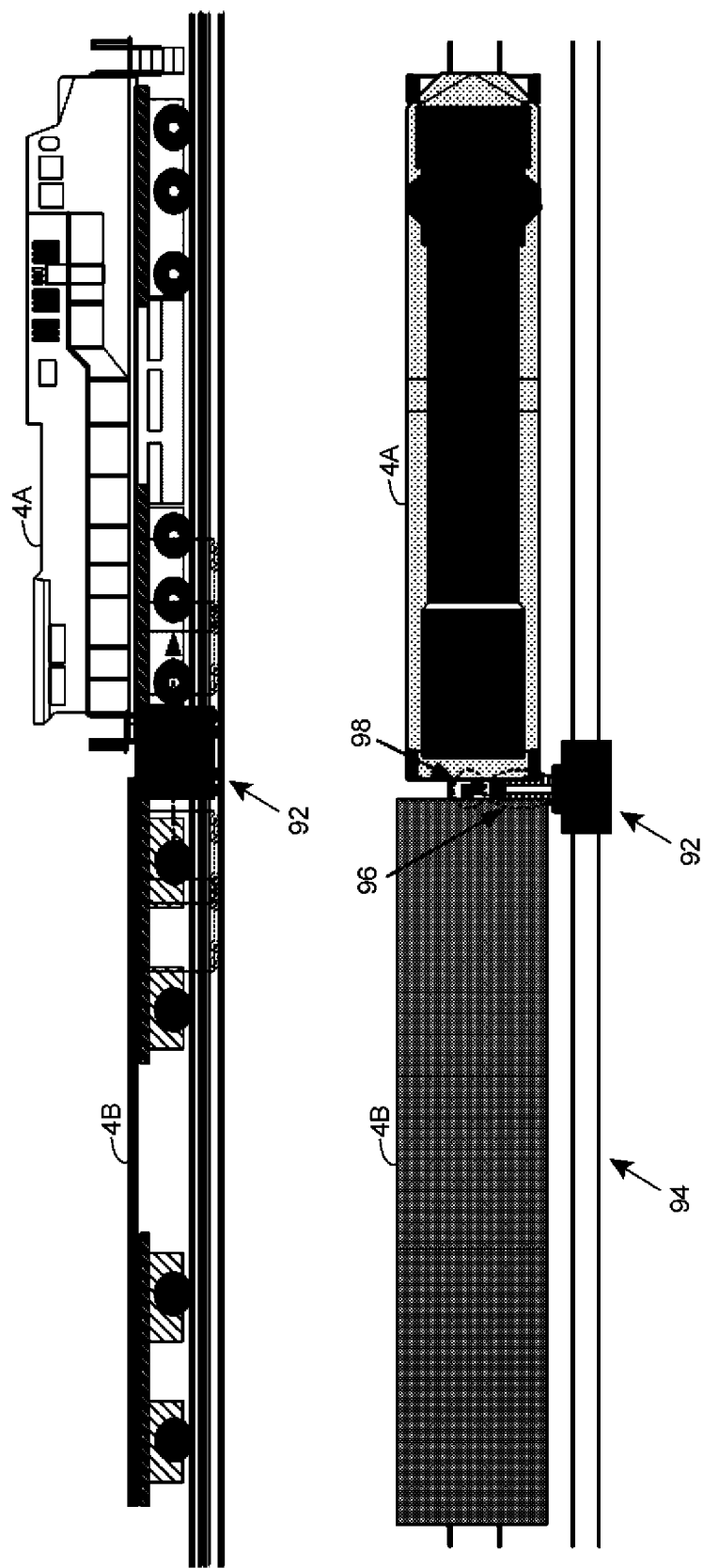
FIG. 11 shows side and top views of an illustrative rail-based robotic device according to an embodiment.

To this extent, FIG. 11 shows side and top views of an illustrative rail-based robotic device 92 according to an embodiment. In an embodiment, robotic device 92 is implemented as part of processing system 20 (FIG. 1), and performs evaluation, repair, and/or decoupling functions. Robotic device 92 can move on a set of rails 94, which run parallel to a rail line, such as rail line 14 (FIG. 1), on which rail vehicles 4A-B are moving. The set of rails 94 can be situated a sufficient distance from rail vehicles 4A-B so that robotic device 92 does not interfere with other operations.

Processing system 20 can align robotic device 92 with a coupling mechanism between two rail vehicles 4A-B so that it can perform one or more actions using any solution. For example, robotic device 92 can include an ability to move itself along the set of rails 94 and include machine vision technology or the like, to align itself with the coupling. Once aligned, robotic device 92 can extend an attachment 96 into the gap between rail vehicles 4A-B to perform one or more actions. In order to avoid damaging one or more components, robotic device 92 can disengage its gears to allow robotic device 92 to move with any movement by rail vehicles 4A-B. Additionally, attachment 96 and/or robotic device 92 can include a stabilizer, which stabilizes a position of attachment 96 and/or robotic device 92 with respect to rail vehicles 4A-B using any solution.

Use of robotic device 92 and attachment 96 can remove and/or reduce the need for individuals to enter the area between two rail vehicles 4A-B. To this extent, an operator can operate robotic device 92 from a location remote from the area between rail vehicles 4A-B, thereby not exposing the operator to danger due to moving rail vehicles 4A-B, adverse weather conditions, and/or the like. Further, attachment 96 can bring a set of components 98 in proximity to the coupling mechanism between rail vehicles 4A-B. The set of components 98 can include, for example: one or more imaging devices (e.g., cameras) for performing an inspection and/or assisting with a repair, coupling, decoupling, or the like; one or more sensors (e.g., infra-red sensor, chemical sensor, and/or the like) for performing an inspection; one or more illumination devices (e.g., lights); and/or one or more manipulators for manipulating one or more rail components, such as pulling or inserting a pin on the coupler, supporting or tying up a dangling hose, connecting or disconnecting a brake hose, and/or the like. In any event, when intended for outdoor operation, the set of components 98 should be configured to operate adequately in a wide variety of conditions.

In an embodiment, robotic device 92 can perform one or more tasks in a fully automated manner. In this case, individuals can be freed from performing relatively simple tasks, and can spend additional time on more demanding tasks. In order to perform automated operations, robotic device 92 should be capable of performing recognition tasks relating to locating the set of components 98 in relation to rail vehicles 4A-B and components thereof, performing operations therewith, and determining when a flaw may be present on rail vehicles 4A-B and/or components thereof.

Fully automated operation can be implemented using a combination of machine vision systems and "smart video" systems. Such systems can be implemented as part of processing system 20 using any solution. To this extent, a well-characterized and determined positioning of robotic device 92 in conjunction with rail vehicles 4A-B, along with movement sensors on attachment 96 and/or the set of components 98, can permit an accurate determination of distances and angles of components with respect to rail vehicles 4A-B. Since the area between rail vehicles 4A-B is a relatively defined volume of space, and the locations of components in the area, such as the coupling mechanism, coupler release handle(s), brake hoses, etc., will be found in a relatively restricted and defined volume of space, processing system 20 and/or robotic device 92 can readily perform the necessary operations to locate component(s) 98 with respect to the components of rail vehicles 4A-B. Further, processing system 20 and/or robotic device 92 can automatically track relationships between two or more components of rail vehicles 4A-B using any solution, e.g., to determine when rail vehicles 4A-B have been successfully decoupled, brake hoses have been successfully attached or detached, and/or the like.

The presence of attachment 96 and a corresponding set of components 98 between rail vehicles 4A-B poses a potential for a collision between rail vehicles 4A-B and attachment 96 and/or component(s) 98. In this case, such a collision may cause damage or impediment to rail vehicles 4A-B and/or attachment 96 and/or component(s) 98. Accordingly, attachment 96 and/or component(s) 98 can be equipped with "breakaway" linkages at strategic points in the assembly. Such linkages can both prevent the mechanism from ever exerting too much force on any component of rail vehicles 4A-B, and also minimize damage to robotic device 92, attachment 96, and/or component(s) 98 in the case of a collision. The location and implementation of the breakaway linkages can be selected using any solution. Further, robotic device 92 can include a set of operating requirements to prevent collisions. For example, robotic device 92 can prevent extension of attachment 96 unless robotic device 92 is aligned and/or stabilized between two rail vehicles 4A-B with the gears disengaged. Similarly, robotic device 92 can prevent lateral movement of robotic device 92 while attachment 96 is extended.

Figure 12:
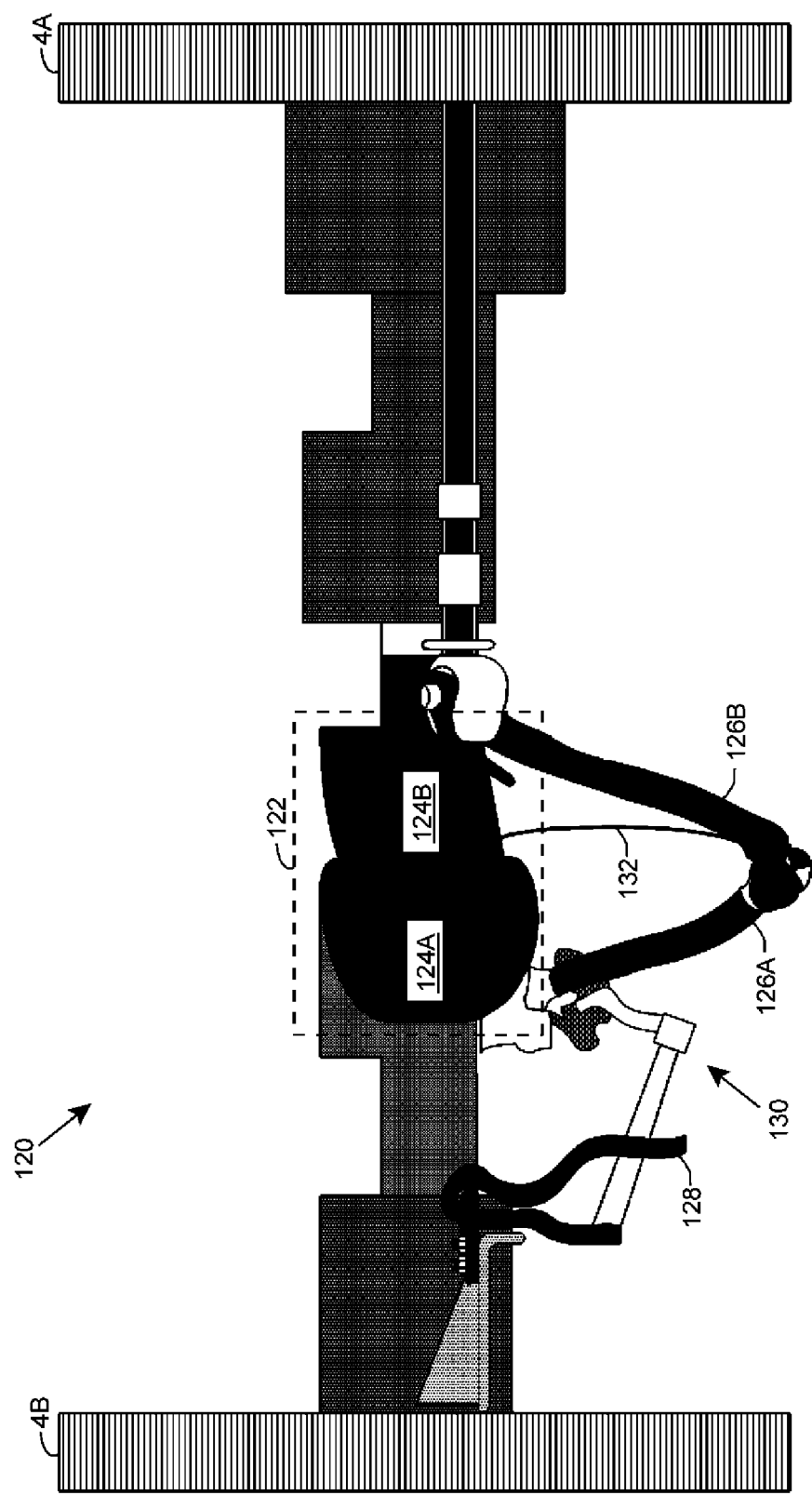
FIG. 12 shows an illustrative coupling mechanism, which is commonly incorporated to couple rail vehicles, according to an embodiment.

FIG. 12 shows an illustrative coupling mechanism 120, which is commonly incorporated to couple rail vehicles 4A-B, according to an embodiment. Rail vehicles 4A-B are connected at two points: a main coupler assembly 122 and the brake hoses 126A-B. In particular, coupler assembly 122 automatically engages when a forward component 124A of a rail vehicle 4B encounters a rear component 124B of another rail vehicle 4A. While coupling mechanism 120 provides for automatic coupling (although brake hoses 126A-B are coupled manually), decoupling continues to be performed manually, which can be dangerous. In particular, a human must go between rail vehicles 4A-B, which be moving and/or move at any time, to perform the decoupling. In fact, the decoupling often relies on the movement of one of the rail vehicles 4A-B once coupler assembly 122 has been decoupled (e.g., due to gravity when rail vehicles 4A-B are on an incline, such as at a classification yard).

To decouple rail vehicles 4A-B, a coupler release handle 128 is moved a relatively small amount in a direction perpendicular to the handle's axis to operate a coupler release mechanism 130. That is, release handle 128 is moved vertically when release handle 128 extends horizontally or horizontally when release handle 128 is substantially vertical in orientation, as shown. Operation of release handle 128 in this manner causes coupler release mechanism 130 to release the components 124A-B of coupler assembly 122. An operator will determine whether rail vehicles 4A-B have separated, and if not, may need to operate release handle 128 again. Brake hoses 126A-B are generally connected to a corresponding portion of coupler assembly 122 by a wire or chain harness 132. As rail vehicles 4A-B separate, harness 132 exerts angular force upon the brake hose connection, causing the brake hoses 126A-B to separate. It is understood that coupling mechanism 120 can include mirrored components of release handle 128 and brake hoses 126A-B on an opposite side, which are not shown for clarity.

A pair of illustrative manipulators are shown and described herein. However, it is understood that these manipulators and the functionality described therewith are only illustrative of numerous types of manipulation devices, which can be utilized to perform a wide variety of tasks. As discussed above, operation of these manipulators can be performed by an operator, by processing system 20 and/or robotic device 92 in an automated manner, and/or some combination thereof.

Figure 13A:
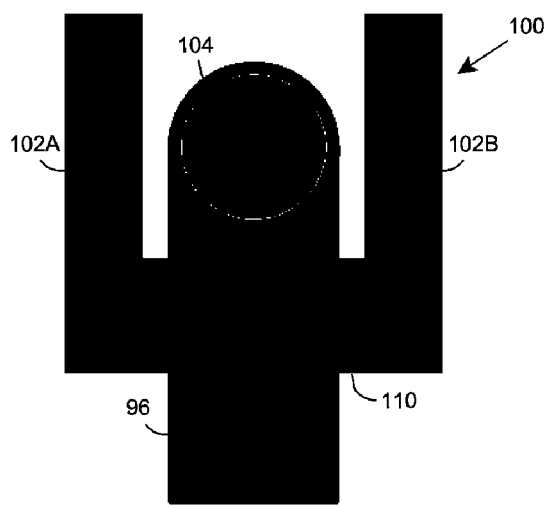
FIGS. 13A-D show operation of an illustrative manipulator according to an embodiment.
Figure 13B:
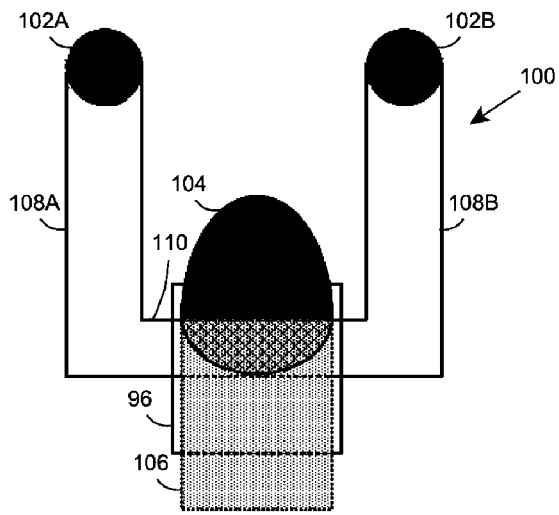

FIGS. 13A-D show operation of an illustrative manipulator 100, which can be located at an end of attachment 96, according to an embodiment. FIGS. 13A-B show a top view and front view, respectively, of manipulator 100. Manipulator 100 includes a pair of restraining rods 102A-B and a contact component 104. Contact component 104 can be moved up/down with respect to restraining rods 102A-B via a piston 106 or the like. Restraining rods 102A-B are positioned above a low point of contact component 104 via a pair of vertical supports 108A-B that are spaced apart using a spacer 110, which is attached to attachment 96 using any solution. Each component of manipulator 100 that contacts one or more components of a rail vehicle 4A-B (FIG. 11) can have a smooth rounded cross section to reduce the risk of wear or damage to one or more components that are manipulated using manipulator 100.

Figure 13C:
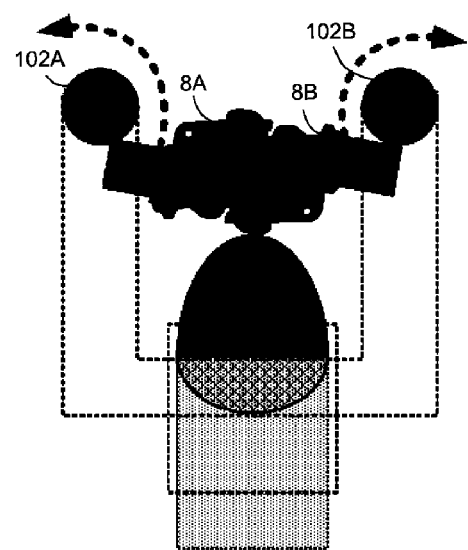
Figure 13D:
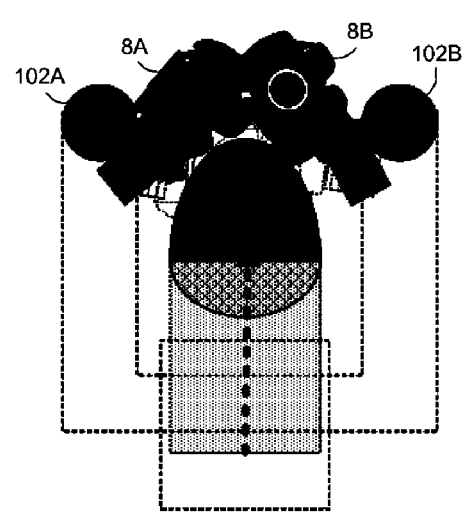

Robotic device 92 can operate manipulator 100 to detach a pair of connectors 8A-B for a standard rail brake hose 126A-B (FIG. 12) on rail vehicles 4A-B. To this extent, FIGS. 13C-D show manipulator 100 being used to detach connectors 8A-B. Initially, robotic device 92 can locate manipulator 100 so that each restraining rod 102A-B is located above the brake hose adjacent to a corresponding connector 8A-B, respectively, while contact component 104 is located below connectors 8A-B. The spacing between restraining rods 102A-B can be selected such that each restraining rod 102A-B can be located near where connectors 8A-B meet the brake hose. Further, robotic device 92 can adjust a width of spacer 110 using any solution to enable the corresponding locations of restraining rods 102A-B to be adjusted. Similarly, a distance between a top of contact component 104 and a bottom of restraining rods 102A-B can be selected such that connectors 8A-B will readily fit between. Further, robotic device 92 can adjust the distance by adjusting a length of vertical supports 108A-B and/or a height of contact component 104 (e.g., via piston 106) using any solution.

Once manipulator 100 is positioned appropriately, robotic device 92 can move contact component 104 upward toward connectors 8A-B using piston 106. Contact component 104 will force connectors 8A-B to move upward, while the brake hose 126A-B is prevented from moving upward by restraining rods 102A-B. As a result, connectors 8A-B will swivel away from one another, resulting in the hoses 126A-B (FIG. 12) becoming separated.

Figure 14A:
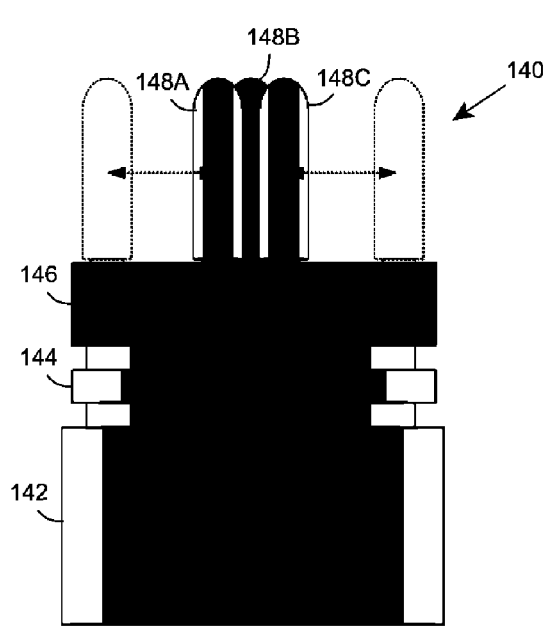
FIGS. 14A-D show operation of another illustrative manipulator according to an embodiment.
Figure 14C:
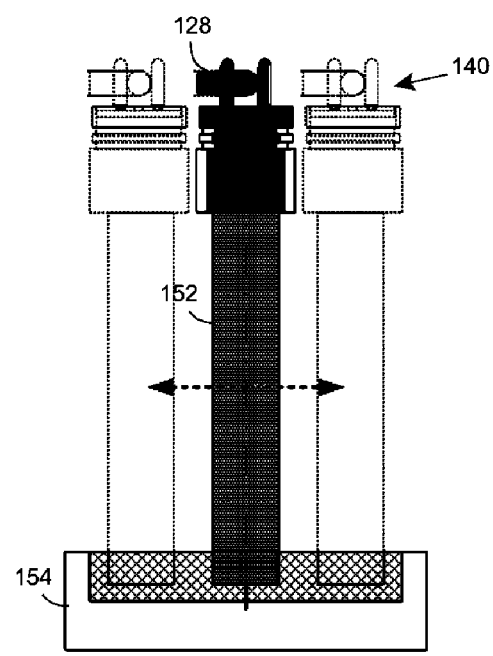
Figure 14B:
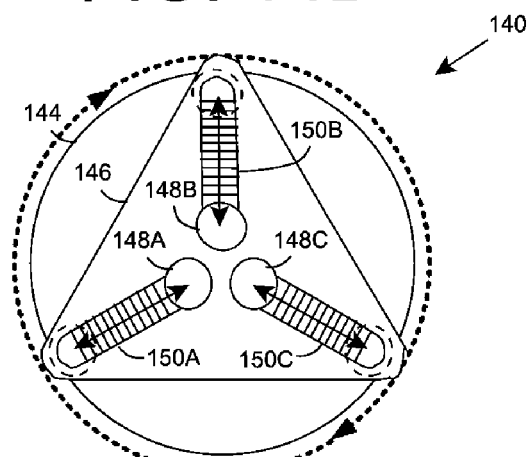

FIGS. 14A-D show operation of another illustrative manipulator 140, which can be located at an end of attachment 96 (FIG. 11), according to an embodiment. FIGS. 14A-B show a front view and top view, respectively, of manipulator 140. Manipulator 140 includes a manipulator attachment 142, a rotation mechanism 144, a gripping mechanism 146, and a plurality of fingers 148A-C. Each finger 148A-C can be equipped with a set of sensors, which can, for example, provide information on an amount of force being exerted on the finger 148A-C. Gripping mechanism 146 includes a plurality of tracks 150A-C along which fingers 148A-C can move. Further, rotation mechanism 144 can enable gripping mechanism 146 and fingers 148A-C to be rotated about its axis. Further, as illustrated in FIG. 14C, manipulator 140 can be attached to an arm 152, which is attached to a movement mechanism 154, and can provide horizontal and/or vertical movement of manipulator 140.

Figure 14D:
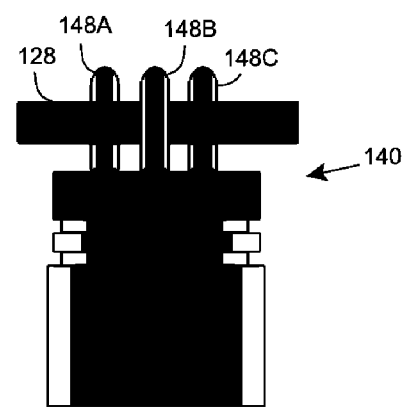

FIGS. 14C-D illustrate use of manipulator 140 to operate release handle 128 in order to detach rail vehicles 4A-B (FIG. 12). In particular, robotic device 92 (FIG. 11) can operate attachment 96 (FIG. 11), movement mechanism 154, and/or manipulator 140 to engage release handle 128. To this extent, release handle 128 can be positioned such that multiple fingers, such as fingers 148A, 148C are on one side of release handle 128, while at least one finger, such as finger 148B is on the other side of release handle 128. Robotic device 92 can determine that fingers 148A-C are properly aligned using, for example, data acquired from a sensor on each finger 148A-C that measures an amount of force being exerted. Once manipulator 140 is engaged, movement mechanism 154 can move (e.g., shake) manipulator 140 in the direction/distance required to release components 124A-B (FIG. 12). Robotic device 92 can determine whether rail vehicles 4A-B have been successfully released from one another. If so, fingers 148A-C can disengage from release handle 128. Otherwise, robotic device 92 can move manipulator 140 again to seek to release components 124A-B.

During operation of release handle 128, robotic device 92 can use data from the force sensors on fingers 148A-C to determine, for example, whether any unusual/abnormal resistance or lack of resistance occurs while the release handle 128 is being moved. Further, robotic device 92 can determine various other faults using any solution. For example, robotic device 92 can determine a fault due to a failure to release rail vehicles 4A-B after a predetermined number of tries, a broken (e.g., stuck or missing) component in coupling mechanism 120 (FIG. 12), and/or the like. In this case, robotic device 92 can generate an alarm, which can be presented to a user for action.

Robotic device 92 also can include a manipulator to perform automated/semi-automated coupling of brake hoses 126A-B. For example, an illustrative manipulator could comprise a combination of manipulators 100 (FIGS. 13A-D), 140 (FIGS. 14A-D) in which restraining rods 102A-B (FIG. 13A) can be replaced with paired fingers 148A-B (FIG. 14A) to hold the brake hose 126A-B. Further, the contact component 104 (FIG. 13b) can be replaced with two fingers, each of which operates as a third "finger" of each pair of fingers and would move along a track with an arc calculated to correspond to the arc of engagement for the two halves of the brake hose connector. Robotic device 92 can operate each gripper device to locate and grasp the appropriate brake hose 126A-B, and the two devices would be brought together to engage as a single unit. By retracting the contact component halves, robotic device 92 would cause the two brake hose connector components to engage.

FIG. 15 shows an illustrative process for processing rail vehicles through a classification yard according to an embodiment, which can be implemented by processing system 20 (FIG. 1). Referring to FIGS. 1 and 15, in process 201, processing system 20 can detect rolling stock using any solution. In process 202, processing system 20 can clean equipment on the rolling stock as it moves along rail line 14. For example, as shown in FIG. 4, processing system 20 (FIG. 1) can comprise a cleaning module 48, which includes one or more devices for cleaning rail vehicles 4A-B, which management component 24 (FIG. 1) can operate to clean various equipment on vehicles 4A-B. Cleaning module 48 is shown including a set of sprays 58A-C that can spray high pressure fluid (e.g., water) at the sides, wheels, suspension, and/or the like of vehicle 4A-B. Additionally, while not shown, it is understood that cleaning module 48 can include other types of cleaning devices, such as one or more brushes, or the like. Management component 24 can adjust operation of the various devices in cleaning module 48 based on a type of rail vehicle 4A-B passing through. For example, when multiple devices are configured to clean a side of rail vehicles 4A-B, one or more of the higher devices can be turned off when a low rail vehicle, such as rail vehicle 4A, is moving through.

Returning to FIGS. 1 and 15, in process 203, processing system 20 can acquire various types of measurement data for each rail vehicle 4A-C (FIG. 3) and/or one or more parts thereof using any solution. The measurement data can include data to determine the identity of the vehicle 4A-C (e.g., RFID data), image data of rail vehicle 4A-C or one or more components thereof, and/or other types of data (e.g., electromagnetic), which processing system 20 can use in evaluating and processing each vehicle 4A-C.

In process 204, processing system 20 can analyze the measurement data for each rail vehicle 4A-C to determine whether one or more defects are present on a rail vehicle 4A-C using any solution. For example, processing system 20 can determine whether a wheel, axle, brakes, or the like, remain within safe operating limits, detect an anomaly in a flaw detection signal that indicates a problem with a piece of equipment, etc. Processing system 20 can implement various types of analysis processes, such as rule sets (e.g., defining safe tolerance ranges with error limits), neural nets, expert systems, waveform analysis, and/or the like in order to determine whether one or more defects may be present on a vehicle 4A-C. In decision 205, processing system 20 determines whether the vehicle 4A-C passed the inspection. For example, processing system 20 can determine whether one or more defects were present. If the vehicle 4A-C passed inspection, in process 206, processing system 20 can route the vehicle 4A-C to one of the outbound (e.g., classification/consist assembly) tracks 16 based on its destination.

When a vehicle 4A-C does not pass the inspection (e.g., includes one or more defects), in decision 207, processing system 20 can determine whether the defect(s) is (are) of the type that can be repaired locally (e.g., in-situ or on local track). For example, defects such as loose/hanging equipment (e.g., a hose) or material, over-height/over-width loads, and/or the like, may be able to be fixed without re-routing the rail vehicle 4A-C and/or routing the vehicle locally, e.g., via a loop-back rail line 15. If so, in process 208, processing system 20 can generate an on-site repair order. In process 209, one or more personnel can perform the repair, and indicate to processing system 20 one or more details of the repair (e.g., time, materials, etc.) as well as whether the repair was successful or not. In decision 210, processing system 20 can determine whether the repair was successful. If so, in process 211, processing system 20 can generate a repair bill for the repair(s) performed on the rail vehicle 4A-C, and in process 212, processing system 20 can route the rail vehicle 4A-C for re-inspection, e.g., via a loop-back rail line 15.

When processing system 20 determines in decision 207 that one or more defects on a vehicle 4A-C cannot be performed in-situ or determined in decision 210 that one or more repairs were unsuccessful, in process 213, processing system 20 can route the vehicle 4A-C to one of a set of maintenance tracks 18. Processing system 20 can route the vehicle 4A-C to the maintenance track 18 via rail line 14 or via rail line 17, e.g., when a repair was first attempted on loop-back rail line 15. In any event, in process 214, processing system 20 can generate a repair order for personnel at a maintenance shop 19. In process 215, one or more maintenance personnel can perform the repair, and indicate to processing system 20 one or more details of the repair (e.g., time, materials, etc.). In process 211, processing system 20 can generate a repair bill for the repair(s) performed on the rail vehicle 4A-C, and in process 212, processing system 20 can route the rail vehicle 4A-C for re-inspection, e.g., via rail lines 15, 17.

In an embodiment, processing system 20 can comprise a routing component 25, which provides for the routing of vehicles 4A-C through classification yard 10, and a separate inspection component 27 that implements the inspection actions described herein. Routing component 25 and inspection component 27 can interact with one another to process vehicles 4A-C through classification yard 10. For example, an existing classification yard 10 may include a management component 24 that includes a routing component 25. Subsequently, management component 24 can be modified to include inspection component 27, and routing component 25 can be modified to interact with inspection component 27.

Figure 16:
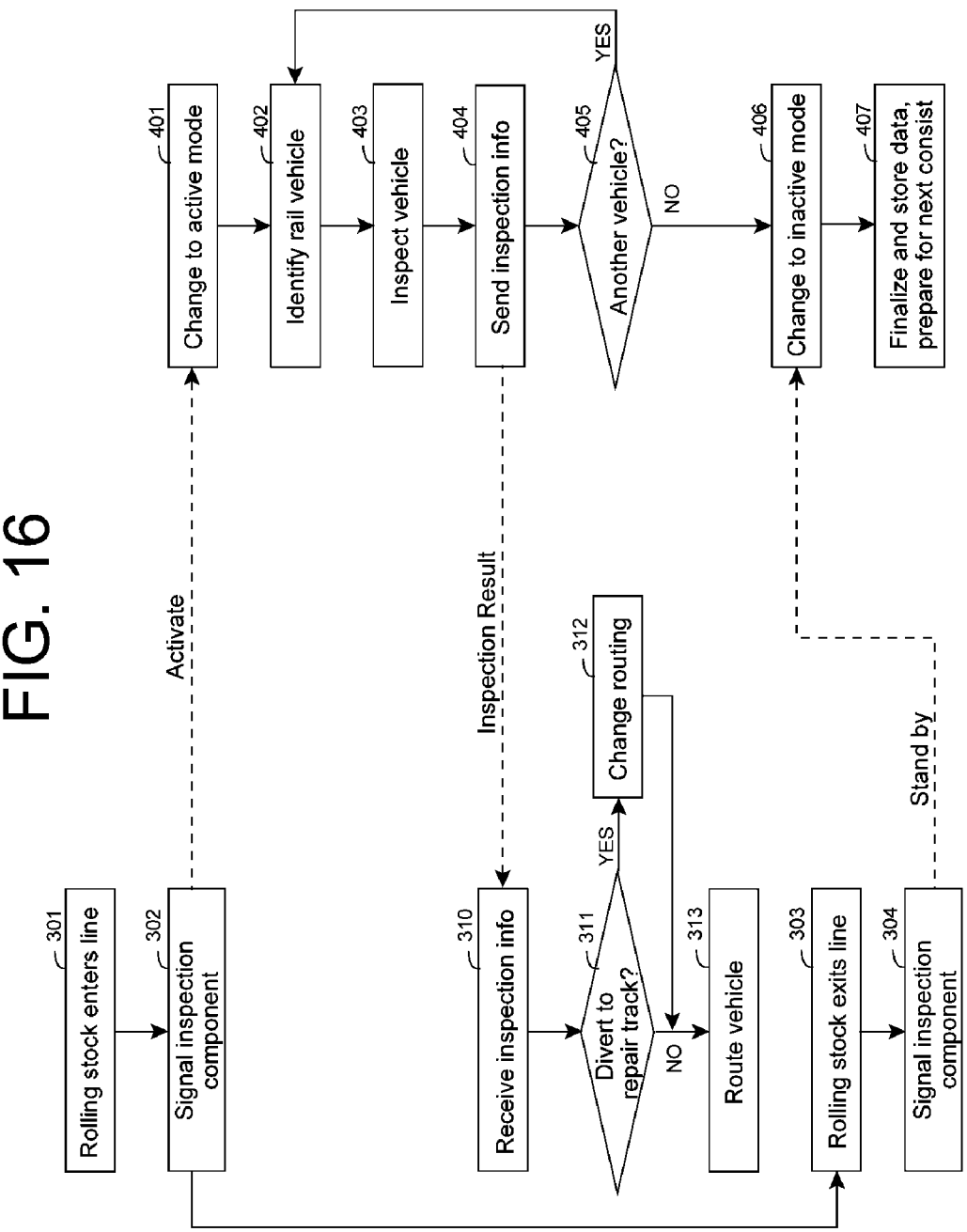
FIG. 16 shows an illustrative process that illustrates interaction between a routing component and an inspection component according to an embodiment.

FIG. 16 shows an illustrative process that illustrates interaction between routing component 25 and inspection component 27 according to an embodiment. Referring to FIGS. 1 and 16, in process 301, routing component 25 can determine that rolling stock has entered rail line 14 using any solution. In process 302, routing component 25 can send an "activate" signal to inspection component 27 to notify it that vehicles 4A-C (FIG. 2) are approaching. It is understood that while not shown for clarity, various other signals can be exchanged between routing component 25 and inspection component 27. For example, inspection component 27 and/or routing component 25 can send an acknowledgment signal in response to a signal received from the other component. Further, when not active, routing component 25 and inspection component 27 can periodically exchange readiness signals (e.g., heartbeat signals) indicating that inspection component 27 is ready to perform an inspection. In either case, should a component not respond to a signal, the sending component can resend the signal, generate an error that can be addressed by personnel, and/or the like.

After receiving an activate signal from routing component 25, in process 401, inspection component 27 can change to an active mode. For example, inspection component 27 can turn on one or more emitting/sensing devices, open one or more protective shutters, and/or the like. In process 402, inspection component 27 can identify a rail vehicle as it approaches evaluation component 22 on rail line 14 using any solution. For example, inspection component 27 can acquire an RFID, determine identifying markings on the side of the rail vehicle, identify the location of the rail vehicle in the train that entered classification yard 10, and/or the like.

In process 403, inspection component 27 can inspect the rail vehicle, e.g., using a process described herein. The inspection can include evaluation of one or more of various components of the rail vehicle including, but not limited to, the wheels, brakes, axles, over height/width, etc. In process 404, inspection component 27 can send an inspection result for processing by routing component 25. The inspection result can indicate whether the vehicle passed or failed the inspection and indicate what, if any, defects may be present on the vehicle. Subsequently, in decision 405, inspection component 27 can wait for another vehicle to approach evaluation component 22. When a vehicle approaches evaluation component 22, inspection component 27 can return to process 402 to inspect the vehicle.

In process 310, routing component 25 can receive the inspection information. In process 311, routing component 25 can determine whether the rail vehicle should be diverted to a repair track. For example, routing component 25 can divert a rail vehicle that fails an inspection and includes one or more defects that require servicing at maintenance shop 19 to a maintenance track 18. Further, routing component 25 can divert a rail vehicle that fails an inspection, but only includes defect(s) that can be repaired in-situ to rail line 15. Still further, defect(s) on a rail vehicle can be repaired while it remains connected to one or more other vehicles on line 14, without diverting the vehicle. If the rail vehicle is to be diverted, then in process 312, routing component 25 can change the routing for the vehicle. In either case, routing component 25 can route the vehicle in process 313, e.g., either to an outbound track 16, maintenance track 18, rail line 15, and/or the like.

The inspection/routing process described herein can continue until all vehicles have been processed. To this extent, after signaling inspection component 27 in process 302, routing component 25 can monitor the progress of the rolling stock along rail line 14. In process 303, routing component 25 can determine that all of the rolling stock has exited rail line 14 using any solution, and in process 304, routing component 25 can signal inspection component 27 to change to stand by mode. Upon receiving a stand by signal, in process 406, inspection component 27 can change to inactive mode. For example, inspection component 27 can turn off one or more emitting/sensing devices, close one or more protective shutters, and/or the like. In process 407, inspection component 27 can finalize and store data (e.g., bad order dispositions, vehicle information, and/or the like), and prepare for the next consist/train. For example, inspection component 27 can verify the functionality of various devices, calibrate and/or clean one or more devices, and/or the like. Upon completion, inspection component 27 can return to an inactive/waiting status.

Routing component 25 can implement one or more of various decision making solutions to determine whether a rail vehicle should be diverted off rail line 14, and therefore out of a consist, in decision 311. In an embodiment, routing component 25 can automatically route any vehicle that inspection component 27 indicates has one or more defects to maintenance track 18, rail line 15, and/or the like. However, re-routing a vehicle may require that the vehicle be disconnected from one or two other vehicles. Further, maintenance shop 19 may require several hours to perform the work (e.g., switching out a wheel, turning a wheel, and/or the like) to return the vehicle to service. To minimize the re-routing of vehicles, routing component 25 can utilize an expert system (e.g., a set of rules) to consider an overall condition of a component (e.g., multiple attributes of the component) when one parameter may affect whether another parameter is deemed safe. For example, a flange height measurement for a wheel may be safe when the rim thickness is sufficient, but may be unsafe if the rim thickness is below a threshold value. To this extent, routing component 25 can utilize an expert system for determining whether the wheel is unsafe, which accounts for the relationship between a flange height and a rim thickness. By considering the overall condition of a component, routing component 25 can avoid re-routing and repairing a vehicle that remains safe to operate.

Routing component 25 can implement a more advanced adaptive model that relies on tracking "Quality of Measurement" (QoM). Processing system 20 can create a QoM model using any solution. For example, processing system 20 can include metrology software that tracks various measurement certainties and anomalies. Each measurement produced by measurement component 22 can be graded based on these statistics. Processing system 20 can aggregate these statistics into an overall QoM model for measurement component 22. Further, processing system 20 can perform data mining on the measurements for specific characteristics, such as measurement percentage, system fault rates, repeat measurement correlation, and/or the like, which processing system 20 can use to create a QoM model using any solution. Regardless, if processing system 20 determines that the system QoM has decreased, processing system 20 can increase the margin of error. Similarly, if processing system 20 determines that the system QoM has increased (e.g., due to favorable versus unfavorable weather), processing system 20 can reduce the margin of error. Routing component 25 can account for the margin of error prior to determining whether to re-route a vehicle. Additionally, if the system QoM falls below a predefined threshold, processing system 20 can generate an alert that maintenance/recalibration may be required for measurement component 22.

When evaluation component 25 receives a measurement that is at or near (e.g., within a margin of error) a given safety limit, it must decide whether to flag the measurement as indicating a defect. For example, a flange height may have a minimum height requirement of two inches, and measurement component 22 may have a margin of error of a sixteenth of an inch. If measurement component 22 returns a measurement of exactly two inches, the actual flange height is likely to be between one and fifteen-sixteenths inches (below the limit) and two and one-sixteenth (over the limit). To this extent, evaluation component 25 can adjust the defect limit to reflect the limits of error, e.g., by widening or narrowing the band in which a defect is evaluated. In this case, evaluation component 25 can make it more/less likely that a vehicle that includes a defect is evaluated as passing the inspection. Evaluation component 25 can make the adjustment based on a severity of the defect (e.g., increased noise in operation versus likely derailment). Regardless, the adjustment will directly affect (e.g., increase or decrease) the number of vehicles that are evaluated as failing inspection.

Over time, processing system 20 can gather a considerable amount of data on vehicles that are inspected on a regular basis. Processing system 20 can analyze the data to produce a reliable model of wear characteristics and patterns through a railroad system, particularly when the railroad system is a "captive fleet" system, such as a transit rail system, an industrial private rail system (e.g., for mining), and/or the like. Processing system 20 can use analysis of the wear characteristics and patterns to reduce unexpected bad-ordering of a vehicle, perform predictive maintenance, and/or the like. Further, processing system 20 can produce a model for certain components that are measured as being close to the end of their safe use without further maintenance. For example, processing system 20 can determine that a vehicle should remain usable for another 10,000 miles, and therefore maintenance can be performed at a destination rather than at the current classification yard 10 (FIG. 1), which may already have a busy repair schedule and therefore have less ability to accommodate repair(s) that are not of an emergency nature.

Figure 17:
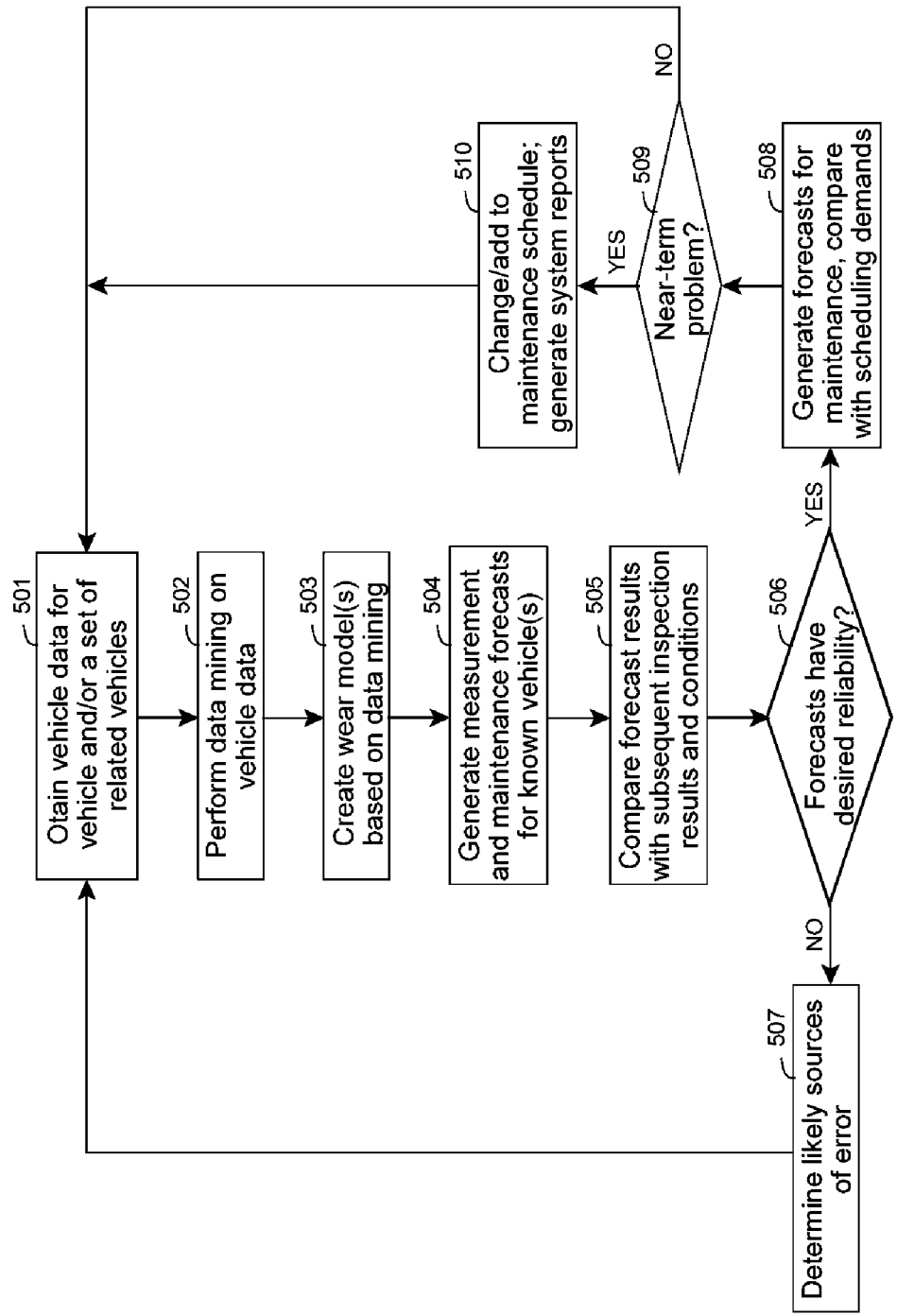
FIG. 17 shows an illustrative process for forecasting maintenance requirements according to an embodiment.

FIG. 17 shows an illustrative process for forecasting maintenance requirements, which can be implemented by processing system 20 (FIG. 1), according to an embodiment. In process 501, processing system 20 can obtain vehicle data for a vehicle and/or a set of related vehicles. The vehicle data can include inspection data obtained from, for example, evaluation component 27, management component 24, and/or one or more other systems external to processing system 20. Further, the data can include operating data for the vehicle, such as data on the operating conditions over a period of time since a previous inspection, weather conditions, a mileage (total and/or since last inspection, and/or the like.

In process 502, processing system 20 can perform data mining on the vehicle data. In particular, processing system 20 can perform any combination of various statistical, heuristic, and/or other analytical/correlative solutions that can derive causal and/or associative connections between aspects of the data. For example, processing system 20 may determine that vehicles that travel over a particular section of track in the winter are more prone to flat spots (e.g., ice may cause more slippage and brakes may be more prone to lock). Similarly, processing system 20 may determine that wear on various components is higher for vehicles traveling through a particular area of the country, e.g., possibly due to rougher track. Further, processing system 20 may determine that hoses degrade more quickly when traveling during winter in areas where salt is commonly used on roads and where the tracks are near public roads. It is understood that these results are only illustrative of numerous types of causal and/or associative connections that processing system 20 may determine.

In process 503, processing system 20 can create a set of wear models for the vehicle based on the results of the data mining using any solution. In process 504, processing system 20 can generate measurement and maintenance forecasts for known vehicle(s), e.g., vehicles that have been previously inspected and/or are periodically inspected, using the wear model(s). For example, processing system 20 can apply measurement data that was recently obtained for the vehicle and data on the future destinations and corresponding operating conditions for the vehicle to the maintenance/wear model(s) and project what future measurement(s) should be and/or when maintenance on the vehicle will be required.

In process 505, processing system 20 can compare the forecast results with the results of a subsequent inspection of the vehicle. In process 506, processing system 20 can determine whether the forecast results had a desired reliability (e.g., within an acceptable margin of error). If not, in process 507, processing system 20 can examine the model(s) and determine likely source(s) of error. Flow can return to process 501 to restart the process with the current inspection results and the likely source(s) of error forming a background for processing system 20 to make adjustment(s) to the model(s).

When processing system 20 determines that the forecast results have a sufficient reliability in process 506, processing system 20 can generate forecasts for maintenance of the vehicle, and compare the forecasts with scheduling demands for utilizing the maintenance resources in process 508. In process 509, processing system 20 can determine whether there exists a near-term problem (e.g., the maintenance forecast indicates that there will be insufficient resources to perform the expected repair(s), indicates that there will be a significant reduction in available transportation resources due to a high demand for repairs, and/or the like). If an alert is present, in process 510, processing system 20 can recommend changes/additions to the maintenance schedule and generate system reports indicating the problem(s). In either case, processing system 20 can continually repeat the process. In this manner, processing system 20 will increasingly obtain and be able to utilize reliable forecasts, which processing system 20 can confirm and/or adjust by the additional data collection, data mining, model generation and testing to insure that the models remain accurate and up-to-date.

While processing system 20 has been shown and described as implementing various processes/actions using illustrative configurations of components, modules, and devices, it is understood that these configurations are only illustrative and that the invention is not limited to any particular combination of components, modules, and/or devices. To this extent, any of the various processes/actions shown and described herein can be implemented by another component/module shown and described herein, or by a separate component/module that is not expressly shown and described herein. As used herein, the terms component and module mean any configuration of hardware, with or without software, which is configured to implement the functionality described in conjunction therewith using any solution. Regardless, it is understood that two or more components/modules/systems may share some/all of their respective hardware.

Still further, some or all of processing system 20 could be implemented apart from a classification yard, e.g., as part of a rail line (e.g., a high-speed rail line) that handles a significant amount of rail traffic. In this embodiment, some or all of management component 24 can be located remote from wayside measurement component 26. In any event, in this embodiment, processing system 20 can evaluate the passing rolling stock in a similar fashion, and automatically send the evaluations forward to a destination of the train. An evaluation that indicates a hazard can be routed directly to system(s) connected to individual(s) responsible for safety and maintenance of the railroad or railroads in the relevant area, for immediate action. To this extent, the safety/maintenance personnel can contact an engineer or other personnel on board the train via a wireless terminal on-board the train, or the like, as to the nature and severity of any detected anomalies. Further, when necessary, the engineer can be instructed to and/or independently take action, such as slowing a speed of the train, in response to the detected anomaly(ies).

While shown and described herein as a method and system for processing rail vehicles, it is understood that aspects of the invention further provide various alternative embodiments. For example, in one embodiment, the invention provides a method of generating a system for processing rail vehicles. In this case, zero or more of the programs, devices, modules, components, etc., of a computer system, such as processing system 20 (FIG. 2), can be obtained (e.g., created, maintained, made available, etc.) and one or more programs, devices, modules, components, etc., for performing a process described herein can be obtained (e.g., created, purchased, used, modified, etc.) and deployed to the computer system. To this extent, the deployment can comprise one or more of: (1) installing program code on a computing device from a computer-readable medium; (2) adding and/or configuring one or more devices (e.g., computing, communications, sensors, emitters, etc.) to the computer system; and (3) incorporating and/or modifying the computer system to enable it to perform a process described herein.

It is understood that aspects of the invention can be implemented as part of a business method that performs a process described herein on a subscription, advertising, and/or fee basis. That is, a service provider could offer to process rail vehicles as described herein. In this case, the service provider can manage (e.g., create, maintain, support, etc.) a computer system, such as processing system 20 (FIG. 2), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of processing rail vehicles, the method comprising:
   identifying each individual rail vehicle in a plurality of attached rail vehicles as the plurality of attached rail vehicles move along a set of rails using data acquired by a first set of sensing devices located external to the plurality of attached rail vehicles;
   acquiring measurement data for each identified rail vehicle as it moves along the set of rails from a second set of sensing devices located external to the plurality of attached rail vehicles;
   analyzing the measurement data for each identified rail vehicle, wherein the analyzing identifies a set of rail vehicle maintenance attributes; and
   automatically and independently routing each of a plurality of subsets of the plurality of attached rail vehicles based on the analyzing.

2. The method of claim 1, wherein the automatically routing includes routing a rail vehicle to an outbound track based on a destination for the rail vehicle when the analyzing indicates that no repair will be performed.

3. The method of claim 1, wherein the analyzing indicates that at least one defect is present for a rail vehicle.

4. The method of claim 3, wherein the automatically routing includes:
   determining whether each of the at least one defect can be repaired locally; and
   routing the rail vehicle based on the determining.

5. The method of claim 3, further comprising:
   generating a repair order for the at least one defect;
   repairing the at least one defect; and
   generating a repair bill for the at least one defect based on the repairing.

6. The method of claim 3, wherein the analyzing includes:
   determining an overall condition of a component of the rail vehicle having a defect based on a plurality of attributes of the component; and
   determining that the at least one defect does not require repair based on the overall condition.

7. The method of claim 1, further comprising:
   obtaining inspection data and operating data for a plurality of related rail vehicles;
   creating a wear model for at least one component of the plurality of related rail vehicles based on the inspection data and operating data; and
   forecasting at least one of: maintenance requirements or measurement data for a rail vehicle using the wear model, wherein the analyzing is based on the forecasting.

8. The method of claim 1, wherein the automatically routing includes detaching a first rail vehicle from a second rail vehicle using a robotic device.

9. A system for processing rail vehicles, the system comprising:
   at least one sensing device configured to acquire data as a plurality of attached rail vehicles move along a set of rails, wherein the at least one sensing device is located external to the plurality of attached rail vehicles;

a component configured to identify each individual rail vehicle in the plurality of attached rail vehicles using the data acquired by the at least one sensing device;

a component configured to analyze measurement data acquired by the one sensing device for each identified rail vehicle, wherein the component identifies a set of rail vehicle maintenance attributes for each identified rail vehicle; and a component configured to automatically and independently route each of a plurality of subsets of the plurality of attached rail vehicles based on the analyzed measurement data.

10. The system of claim 9, wherein the component configured to automatically route is configured to route a rail vehicle to an outbound track based on a destination for the rail vehicle when the analyzed measurement data indicates that no repair will be performed.

11. The system of claim 9, wherein the analyzed measurement data indicates that at least one defect is present for a rail vehicle.

12. The system of claim 11, wherein the component configured to automatically route is configured to:
determine whether each of the at least one defect can be repaired locally; and
route the rail vehicle based on the determination.

13. The system of claim 11, further comprising a component configured to generate a repair order for the at least one defect and generate a repair bill for the at least one defect after the at least one defect is repaired.

14. The system of claim 11, wherein the component configured to analyze measurement data is configured to:
determine an overall condition of a component of the rail vehicle having a defect based on a plurality of attributes of the component; and
determine that the at least one defect does not require repair based on the overall condition.

15. The system of claim 9, further comprising a component configured to create a wear model for at least one component of the plurality of related rail vehicles based on inspection data and operating data for the plurality of related rail vehicles, and forecast at least one of: maintenance requirements or measurement data for a rail vehicle using the wear model, wherein the component configured to analyze measurement data uses the forecast.

16. The system of claim 9, wherein the component configured to automatically route includes a robotic device configured to detach a first rail vehicle from a second rail vehicle.

17. A system for processing rail vehicles, the system comprising:
at least one sensing device configured to acquire maintenance measurement data as a plurality of attached rail vehicles move along a set of rails, wherein the at least one sensing device is located external to the plurality of attached rail vehicles;

a component configured to identify each individual rail vehicle in the plurality of attached rail vehicles using the maintenance measurement data acquired by the at least one sensing device; and a component configured to automatically and independently route each of a plurality of subsets of the plurality of attached rail vehicles to a corresponding outbound track based on a destination for the rail vehicle, wherein the component configured to automatically route includes a robotic device configured to detach a first rail vehicle from a second rail vehicle in the plurality of attached rail vehicles.

18. The system of claim 17, further comprising a component configured to analyze measurement data acquired by the at least one sensing device for each identified rail vehicle to determine a presence of at least one defect for each identified rail vehicle, wherein the component configured to automatically route is configured to route an identified rail vehicle for repair when the analyzed measurement data indicates the presence of at least one defect that requires repair and can be repaired locally.

19. The system of claim 18, wherein the component configured to analyze measurement data is configured to:
determine an overall condition of a component of the rail vehicle having a defect based on a plurality of attributes of the component; and
determine that the at least one defect does not require repair based on the overall condition.

20. The system of claim 18, further comprising a component configured to create a wear model for at least one component of the plurality of related rail vehicles based on inspection data and operating data for the plurality of related rail vehicles, and forecast at least one of: maintenance requirements or measurement data for a rail vehicle using the wear model, wherein the component configured to analyze measurement data uses the forecast.

* * * * *